United States Patent
Gardiner

(10) Patent No.: US 10,677,405 B2
(45) Date of Patent: *Jun. 9, 2020

(54) HIGH EFFICIENCY DAYLIGHTING STRUCTURE

(71) Applicant: SerraLux Inc., Los Gatos, CA (US)

(72) Inventor: Mark E Gardiner, Santa Rosa, CA (US)

(73) Assignee: SERRALUX INC., Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/798,768

(22) Filed: Oct. 31, 2017

(65) Prior Publication Data

US 2018/0320850 A1 Nov. 8, 2018

Related U.S. Application Data

(62) Division of application No. 14/827,769, filed on Aug. 17, 2015, now Pat. No. 9,803,817.

(Continued)

(51) Int. Cl.
*F21S 11/00* (2006.01)
*E06B 9/24* (2006.01)
(Continued)

(52) U.S. Cl.
CPC ............... *F21S 11/007* (2013.01); *E06B 9/24* (2013.01); *E06B 9/266* (2013.01); *E06B 9/386* (2013.01);
(Continued)

(58) Field of Classification Search
CPC ............................. F21S 11/007; E06B 9/264
See application file for complete search history.

(56) References Cited

U.S. PATENT DOCUMENTS

| 3,031,351 A | 4/1962 | McIvaine |
| 4,226,051 A | 10/1980 | Thompson |

(Continued)

FOREIGN PATENT DOCUMENTS

| WO | 1997/031276 A1 | 8/1997 |
| WO | 2014/078812 A1 | 5/2014 |
| WO | 2014200113 A1 | 12/2014 |

OTHER PUBLICATIONS

PCT International Search report and written opinion of patentability in PCT/US2015/04953.

(Continued)

*Primary Examiner* — Christopher E Mahoney
(74) *Attorney, Agent, or Firm* — Edward S. Sherman

(57) ABSTRACT

A high efficiency daylight directing structure for application on fenestration deploys closely spaced macroscopic bars of transparent resin to eliminate different forms of glare. The spaced apart surfaces provide for efficient reflection of selective incident light, by TIR or metallic surfaces, via the ultra-smooth native surfaces from a mold or casting process. A close spacing is readily obtained in various attachment methods to boost efficiency. The fabrication method allows selective deposition of absorbing layers, such as by of painting/printing between alternating native optical surface to provide one way transparency at high angles of incidence. The bars are supported on at least one common planar surface by transparent support member with an optical quality adhesive material filling any imperfection in the bars common planar surface that form in fabrication.

13 Claims, 24 Drawing Sheets

Related U.S. Application Data

(60) Provisional application No. 62/164,834, filed on May 21, 2015, provisional application No. 62/050,018, filed on Sep. 12, 2014, provisional application No. 62/049,941, filed on Sep. 12, 2014, provisional application No. 62/038,956, filed on Aug. 19, 2014.

(51) Int. Cl.
  *G02B 19/00* (2006.01)
  *E06B 9/266* (2006.01)
  *E06B 9/386* (2006.01)

(52) U.S. Cl.
  CPC ..... *G02B 19/0028* (2013.01); *G02B 19/0042* (2013.01); *E06B 2009/2417* (2013.01)

(56) References Cited

U.S. PATENT DOCUMENTS

| | | | |
|---|---|---|---|
| 4,509,825 A | 4/1985 | Otto et al. | |
| 4,989,952 A * | 2/1991 | Edmonds | E04C 2/54 219/121.67 |
| 5,461,496 A | 10/1995 | Kanada et al. | |
| 5,731,900 A | 3/1998 | Milner | |
| 5,880,886 A | 3/1999 | Milner | |
| 6,435,683 B1 * | 8/2002 | Milner | E06B 9/24 359/599 |
| 6,616,285 B2 | 9/2003 | Milner | |
| 6,980,728 B2 | 12/2005 | Ladstätter et al. | |
| 8,520,305 B2 | 8/2013 | Suzuki et al. | |
| 8,873,146 B2 * | 10/2014 | Gardiner | G02B 5/045 359/592 |
| 9,341,334 B2 * | 5/2016 | Fujioka | F21S 11/007 |
| 9,784,030 B2 * | 10/2017 | Gardiner | E06B 9/264 |
| 10,161,585 B2 * | 12/2018 | Gardiner | F21S 11/007 |
| 2003/0127197 A1 | 7/2003 | Lai | |
| 2004/0253456 A1 | 12/2004 | Braybrook | |
| 2009/0009870 A1 | 1/2009 | Usami | |
| 2011/0043919 A1 | 2/2011 | Ko | |
| 2012/0033302 A1 * | 2/2012 | Suzuki | B29D 11/00605 359/597 |
| 2012/0168070 A1 | 7/2012 | Nelson et al. | |
| 2013/0087294 A1 | 4/2013 | Khajavi | |
| 2013/0265642 A1 * | 10/2013 | Vasylyev | G02B 19/0042 359/595 |
| 2014/0049983 A1 | 2/2014 | Nichol et al. | |
| 2014/0055859 A1 | 2/2014 | Vasylev et al. | |
| 2014/0104689 A1 | 4/2014 | Padiyath et al. | |
| 2014/0211331 A1 | 7/2014 | Paditath et al. | |
| 2015/0226394 A1 * | 8/2015 | Ueki | E06B 9/386 359/595 |
| 2016/0178164 A1 * | 6/2016 | Nishida | E06B 9/303 359/596 |

OTHER PUBLICATIONS

PCT International Search report and written opinion of patentability in PCT/US2015/045674.

Summary of Office Action in Taiwanese Patent Application 104130295 dated Dec. 28, 2018, and Copy in Chinese Language.

Summary of Office Action in Chinese Patent Application No. 201510768306.6 dated Jul. 27, 2018, and Copy in Chinese Language.

* cited by examiner

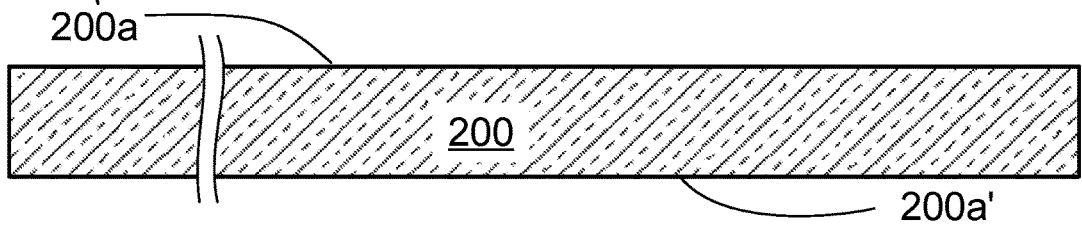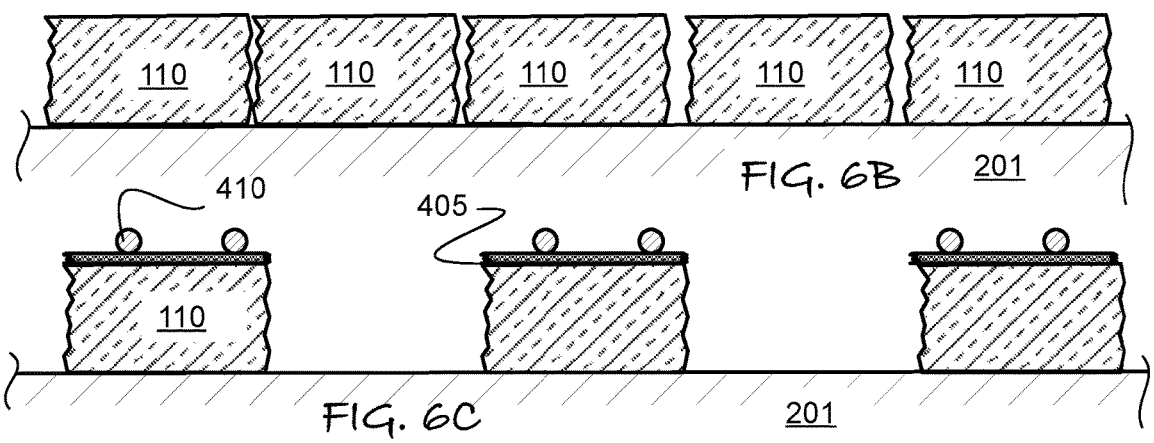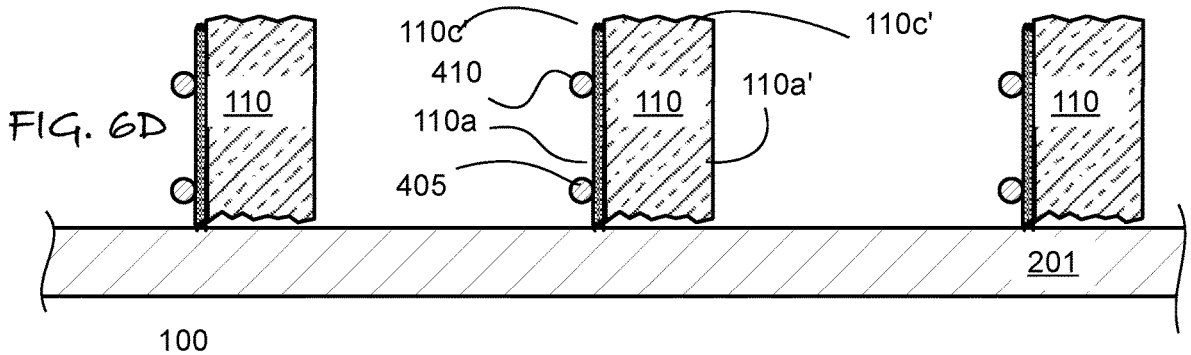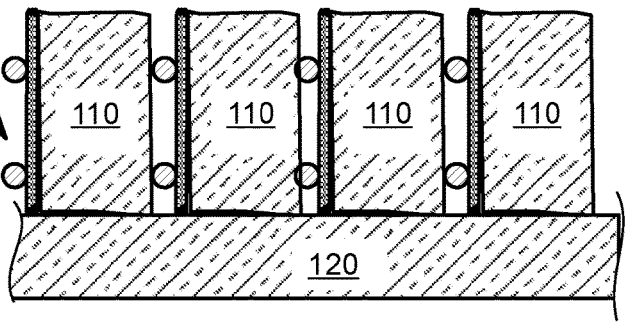

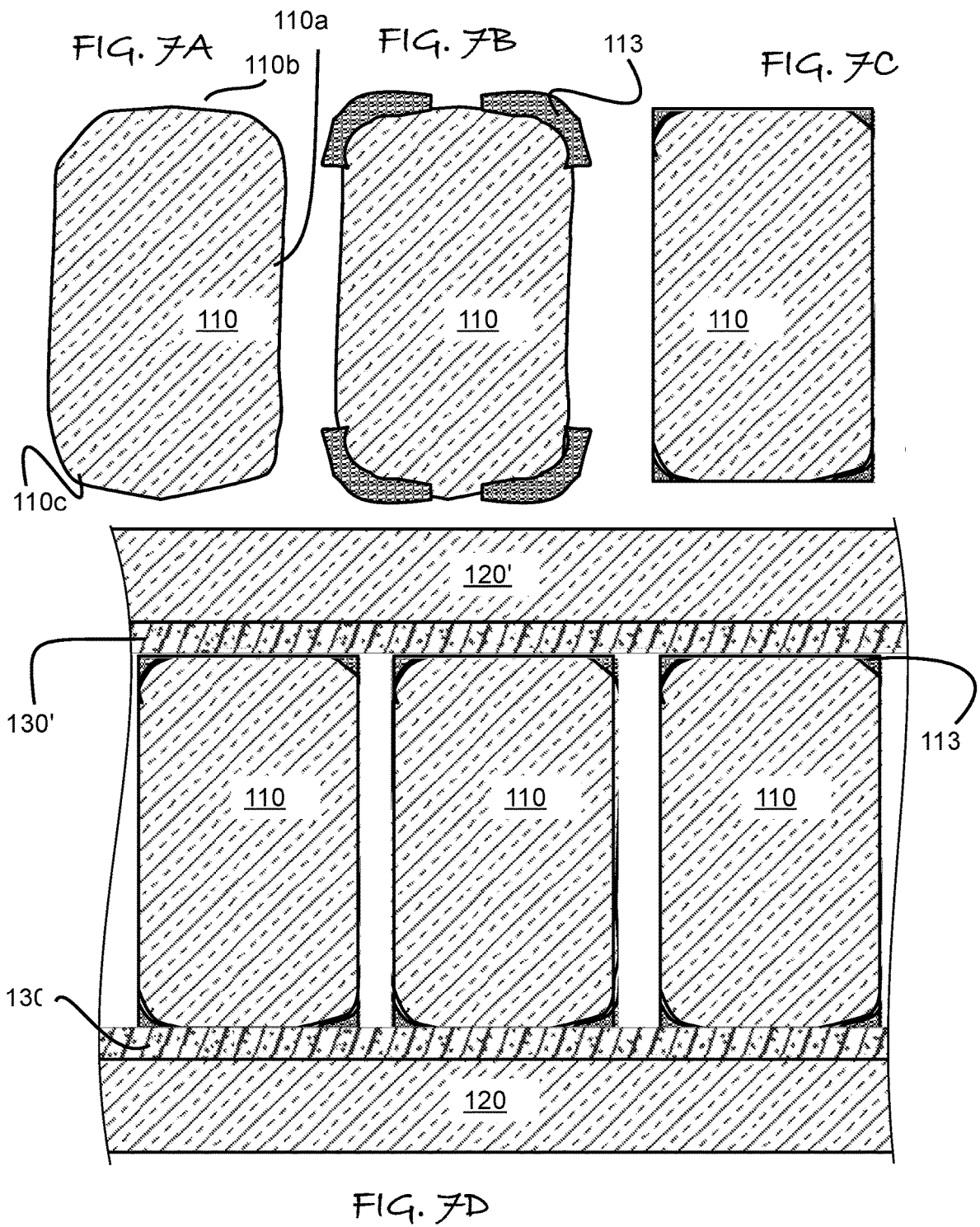

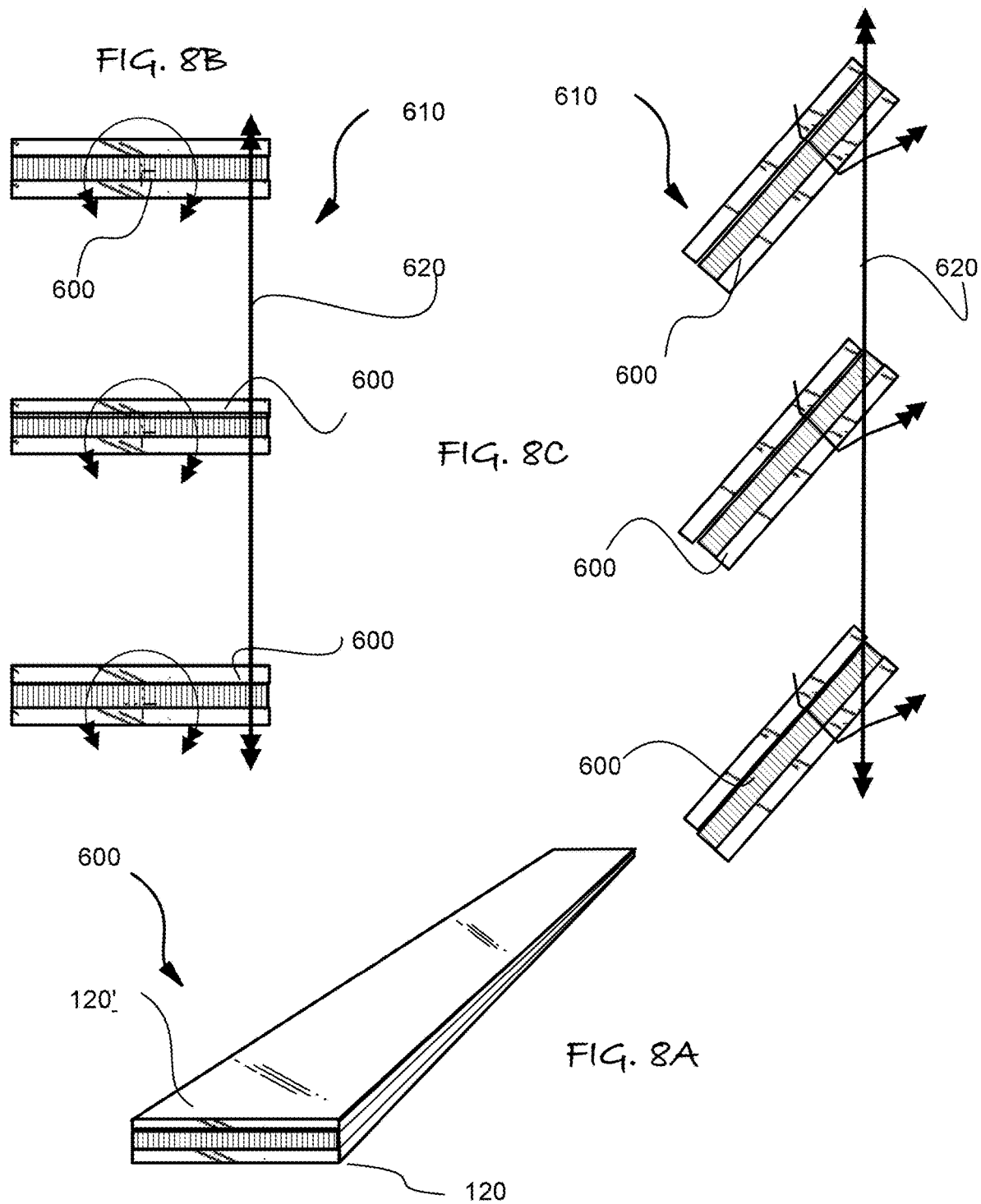

FIG. 9A
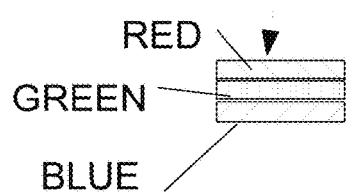
FIG. 9B (Dimensions in microns)

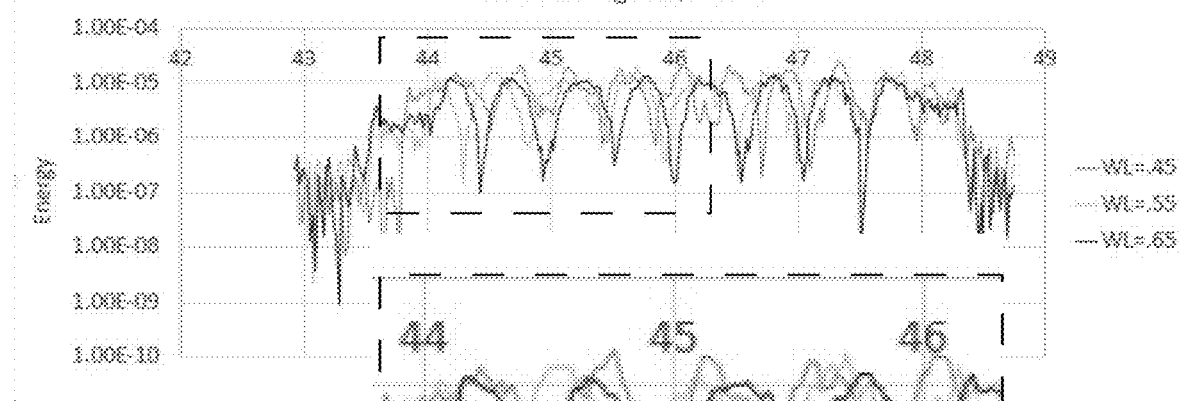
FIG. 13A
FIG. 13B
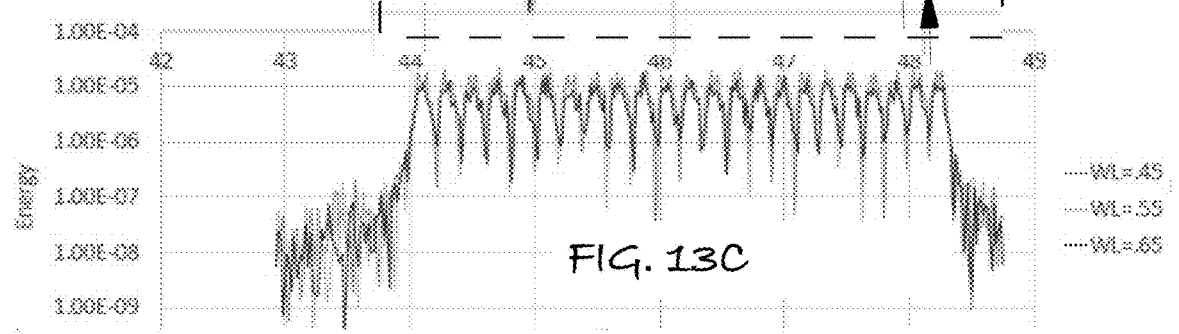
FIG. 13C
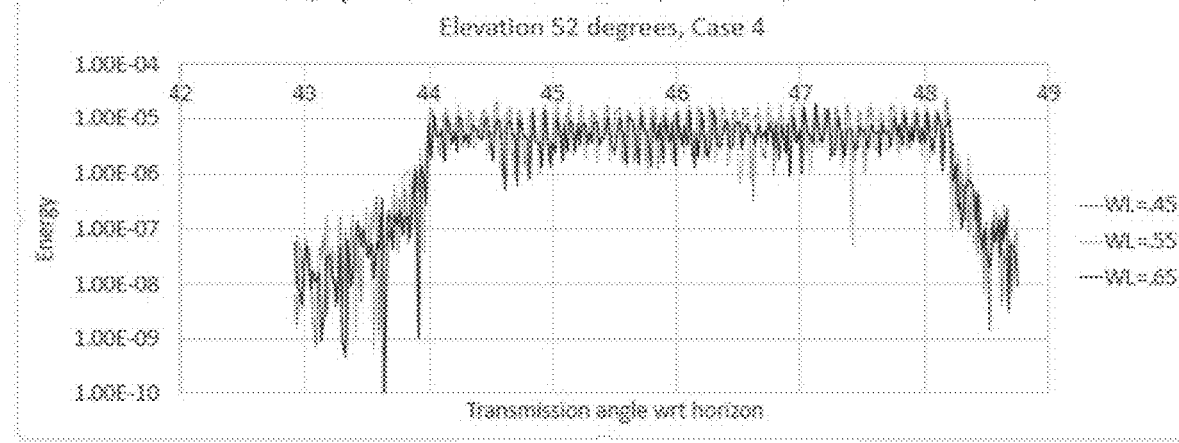
FIG. 13D

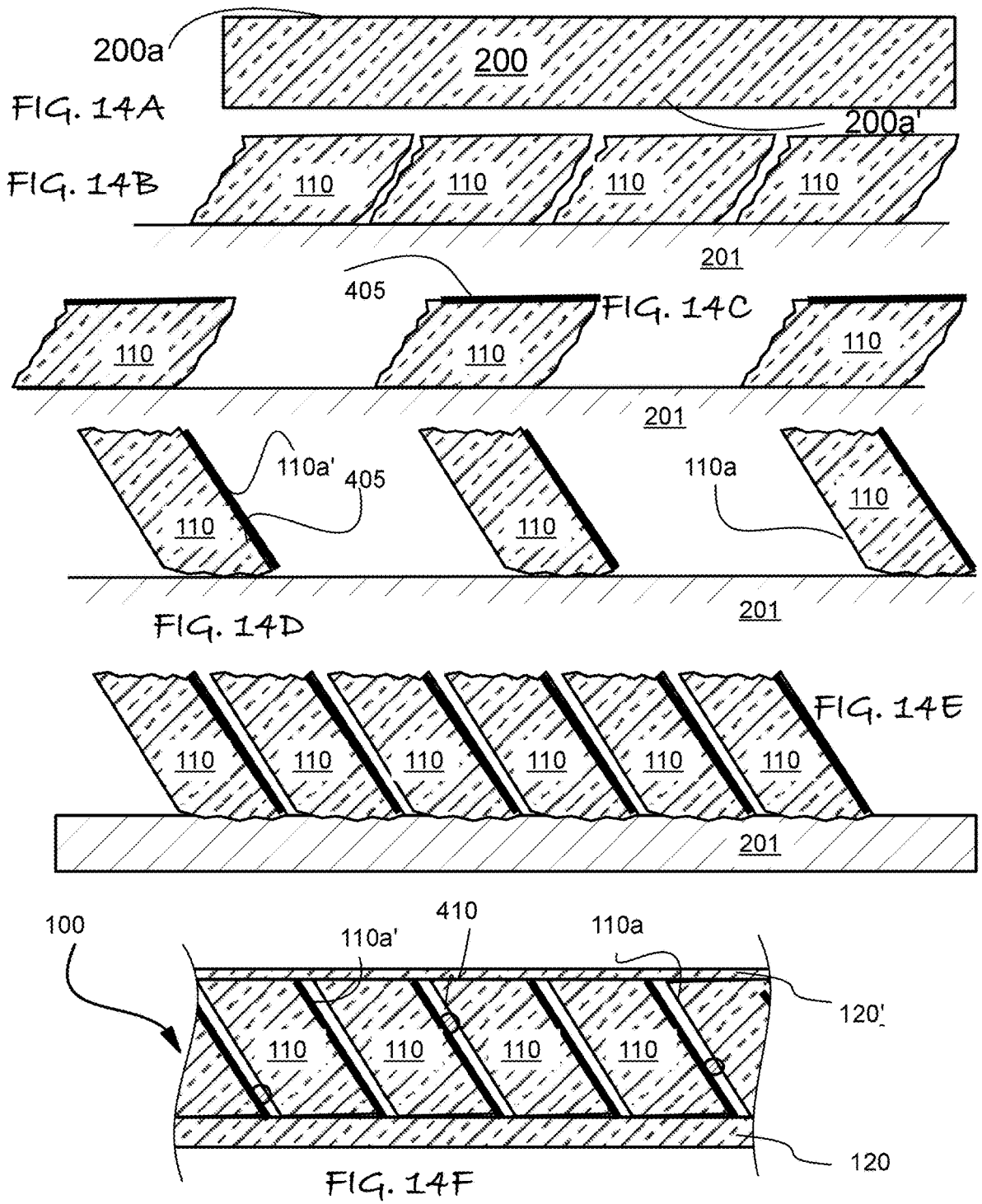

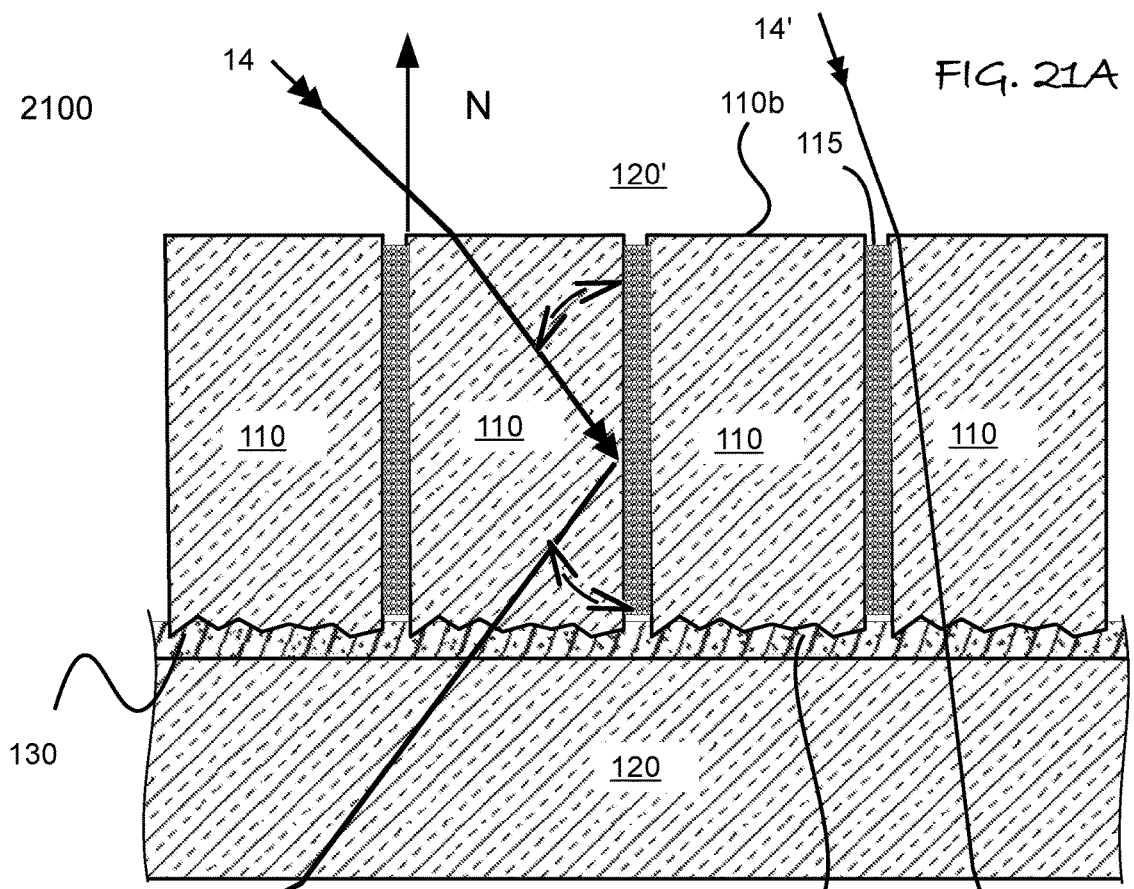
FIG. 21A
FIG. 21B
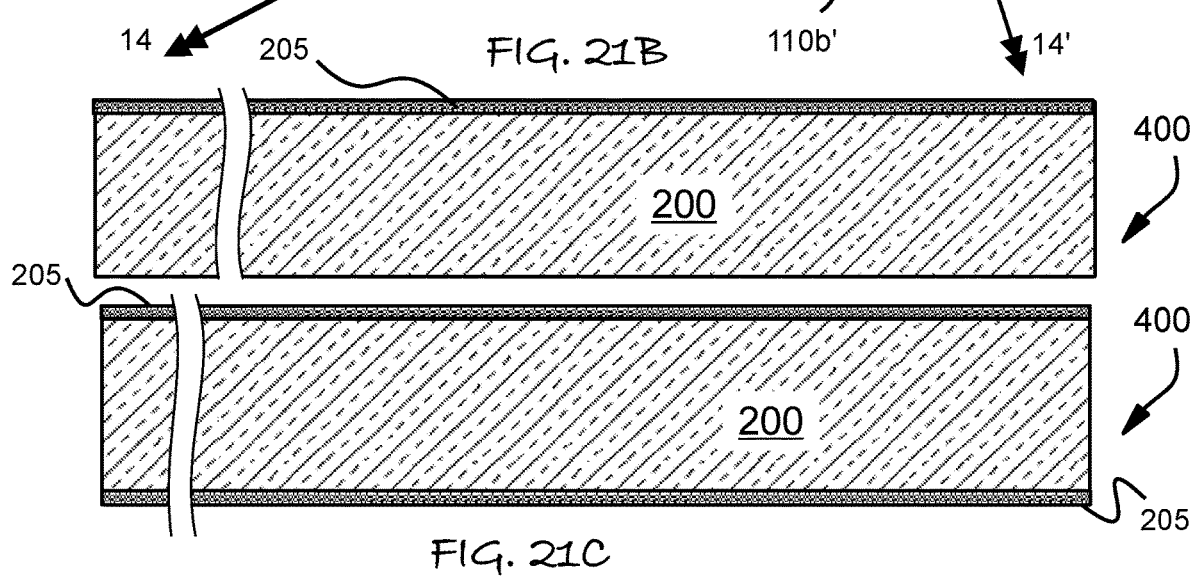
FIG. 21C

HIGH EFFICIENCY DAYLIGHTING STRUCTURE

CROSS REFERENCE TO RELATED APPLICATIONS

The present application is a Division of and claims the benefit of priority to the US Pat. Application of the same tile that was filed on 17 Aug. 2015, having application Ser. No. 14/827,769; which in turn claims the benefit of priority to the following US Provisional Patent Applications: Appl. No. 62/038,956 (filed Aug. 19, 2014), Appl. No. 62/049,941 (filed Sep. 12, 2014), Appl. No. 62/050,018 (filed Sep. 12, 2014) and Appl. No. 62/164,834 (filed May 21, 2015), all of which are incorporated herein by reference.

14827769

BACKGROUND OF INVENTION

The field of inventions is a light re-directing structure suitable for use with exterior glazing to selectively enhance the penetration of exterior light within an interior space.

Such light directing structures are well known and rely primarily on total internal reflection (TIR) of light incident at high angles on a planar transparent member which either forms a glazing surface or is mounted parallel to a glazing surface. High angled incident light, rather than being transmitted directly toward the floor close to a window, is re-directed upward toward the ceiling so that it then scatters and then penetrates farther as natural light into the interior rooms of the structure.

It should be readily appreciated that controlling the re-directed angle allows for greater penetration of re-directed light, as the light incident at high angle near noon time, would be directed toward the ceiling rather than the floor. The re-directed light would be scattered on illuminating the room's ceiling to provide natural diffuse light from above, rather than producing glare from a polished or specular floor surface, or being absorbed by the floor covering; where it would not contribute to the illumination of work surfaces. Such redirection of the natural light thus the minimizes the need for artificial lighting, as well as contributing to the work productivity and well being of the additional building inhabitants that can enjoy natural light.

However, such light re-directing structures while generally effective have limitation and trade-offs between desirable benefits and undesirable effects.

It is a general objective of the invention to increase the efficiency of light re-direction while simultaneously greatly reducing the undesirable effects that may have been unappreciated or poorly understood in the prior art.

The above and other objects, effects, features, and advantages of the present invention will become more apparent from the following description of the embodiments thereof taken in conjunction with the accompanying drawings

SUMMARY OF INVENTION

In the present invention, the first object is achieved by providing a daylighting structure comprising plurality of transparent solid polymeric bars having opposing native optical quality surfaces oriented in a vertical plane, each bar separated from the native surface of the adjacent bar by a gap, a first transparent planar support member connecting common surfaces on a first side of the bars that is orthogonal to the native optical quality surface, an adhesive material interposed between and connecting the common surfaces of the polymeric bars and the planar support member, in which the adhesive material fills optical imperfections of the first side of the bars that is connected to the transparent planar support member.

A second aspect of the invention is such a daylighting structure in which the adhesive material fills optical imperfections of the first side of the bars that is connected to the transparent planar support member.

Another aspect of the invention is any such a daylighting structure wherein said bars are parallelograms.

Another aspect of the invention is any such a daylighting structure further comprising a second transparent planar member connected to the polymeric bars on the opposite side of the first transparent planar member.

Another aspect of the invention is any such a daylighting structure wherein one of the opposing optical surfaces of each bar has an absorbing coating.

Another aspect of the invention is any such a daylighting structure wherein the absorbing coating has spaced apart peaks that contact the native optical surface of the adjacent bars.

Another aspect of the invention is any such a daylighting structure where the gaps between adjacent bars have a pitch of at least about 0.5 mm.

Another aspect of the invention slat for assembly into a louver assembly for variable light re-direction, the slat having an aspect ratio of at least about 6 and a plurality of spaced apart reflective surfaces with a pitch of at least about 500 microns.

Another aspect of the invention is such a slat for assembly into a louver assembly for variable light re-direction wherein the reflective surface are TIR surfaces.

Another aspect of the invention is any such a slat for assembly into a louver assembly for variable light re-direction wherein the reflective surface have an aspect ratio of the pitch of the reflective surface to the height of the reflective surface of at least about 1.5.

Another aspect of the invention is any such a slat for assembly into a louver assembly for variable light re-direction in which the edges of the reflective surfaces have a radius of curvature of less than about 2% of the pitch spaced apart reflective surfaces.

Another aspect of the invention is any such a slat for assembly into a louver assembly for variable light re-direction in which the spaced apart reflective surfaces are parallel to each other.

Another aspect of the invention is any such a slat for assembly into a louver assembly for variable light re-direction in which the adjacent spaced apart reflective surfaces have at least one of a triangular shape, a symmetric V-shape and an asymmetric V-shape.

Another aspect of the invention is any such a slat for assembly into a louver assembly for variable light re-direction wherein the slat has see-through visibility and the reflective surface are TIR surfaces.

Another aspect of the invention is any such a slat for assembly into a louver assembly for variable light re-direction the slat having an aspect ratio of at least about 12.

Another aspect of the invention is any such a slat for assembly into a louver assembly for variable light re-direction the slat having an aspect ratio of at least about 24.

The above and other objects, effects, features, and advantages of the present invention will become more apparent from the following description of the embodiments thereof taken in conjunction with the accompanying drawings.

BRIEF DESCRIPTION OF DRAWINGS

FIG. 2A is a flow chart of steps used to create the light re-directing structures of FIGS. 1 and 3, whereas FIG. 2B-F are schematic cross-sectional elevations of the transformation of materials in these steps.

FIG. 6A-6E illustrate via schematic cross-sectional elevations a variant of the process steps of FIG. 4 to create a more preferred embodiment of the light re-directing structures.

FIG. 7A-D illustrate the optical elements being transformed in an alternative aspect of the process of FIGS. 2, 4 and 5.

FIG. 8A is a perspective view of an embodiment of the invention in the form of a louver panel, whereas FIGS. 8B and 8C illustrate alternative positions of multiple louvers.

FIG. 9A is a close up photograph illustrating observed diffraction and associated glare from low angle sun in a light re-directing micro-structure disclosed in US Pat. Appl. No. 2014/0133030A1, with the black line inset in FIG. 9B illustrating color separation that is not visible in a grey scale print of the photograph.

FIG. 10A is a photograph illustrating glare across the entire window in FIG. 9, whereas

FIG. 13A-D illustrate the effects of diffraction and dispersion of the FIG. 11B structure (FIGS. 13A and 13B) to 10× (FIG. 13C) and 20× (FIG. 13D) larger structures.

FIG. 14A-14F illustrates the steps in fabricating an alternative embodiment of the invention in which the optical elements are parallelograms.

FIG. 21A is a cross-sectional elevation of another embodiment of a see through light directing structure in which the TIR or reflective surfaces are replaced with absorbing surfaces by fabricating the structure from the planar sheet material shown in cross-sectional elevation in FIG. 21B or FIG. 21C.

DETAILED DESCRIPTION

Figure 1:
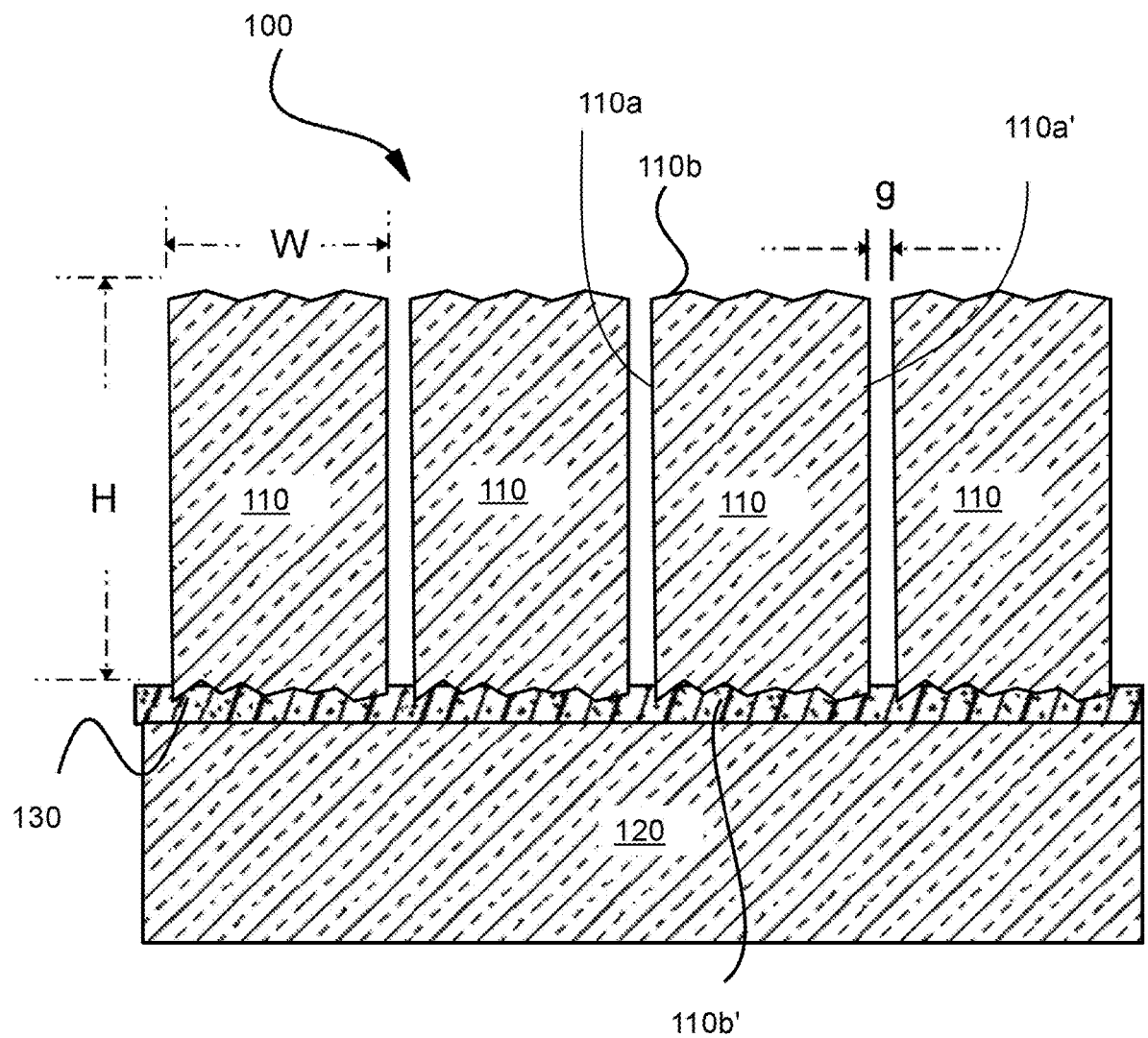
FIG. 1 is a schematic cross-sectional elevation of a first embodiment of a light re-directing structure.

Referring to FIGS. 1 through 24, wherein like reference numerals refer to like components in the various views, there is illustrated therein a new and improved High Efficiency Daylighting Structure, generally denominated 100 herein.

In accordance with the present invention the High Efficiency Daylighting Structure 100 comprises a plurality of transparent optical elements, bars or rods 110 having opposing native optical quality surfaces 110a and 110a', which in the first embodiment in FIG. 1, are oriented in commonly parallel and preferably vertical planes with respect to their supporting substrate 120. Each bar 110 is separated from the native surface 110a or 110a' of the adjacent bar by a gap of width g.

As used herein, a native surface means an optically flat and smooth surface that is completed or finished in a sheet form, such as being cast on a polished surface or as a low viscosity fluid pool, such as the flat faces of acrylic sheet. Native surfaces are optimally formed by the solidification of a quiescent fluid pool that is flattened by gravitation force. However, a native surface within the scope of the claimed invention can be formed by replicating another native surface, or a highly polished molded surface. For example, glass sheets formed by solidification on molten tin bath form very high quality native optical surface, and can be used as surfaces for molding. Acrylic, poly(methyl methacrylate) resin sheets are readily formed by a thermoset molding process of methylmethacrylate monomer cast between such flat and smooth glass sheet. A preferred native surface is such a surface produced by casting that replicates the smoothness and flatness of the glass mold.

Alternatively, a rough surface can be planarized to from either a mold surface or the optical quality of native surface by solvent vapor polishing (in the case of polymers and resins, as well as other finishing steps, such as subtractive processes of polishing, or addition process of coating multiple thin layers which provide smoothing as they spread under gravity and fill surface imperfections. Such subtractive processes also include planarizing the surface of extruded as well as cast sheet material. Hence, native surface also means a surface that has been planarized over a relatively large area, and is preserved in further steps of optical device fabrication. Generally, such polished or native surfaces have a surface roughness of less than about 0.2 µm RMS, but more preferably less than about 25 nanometers (nm) RMS, and most preferably less than about 10 nm RMS.

It should be first broadly appreciated that the instant invention constructs light re-directing structure from substrate having native surface in a method that converts the native surface into a plurality of surfaces oriented for the TIR of incident light.

Figure 2:
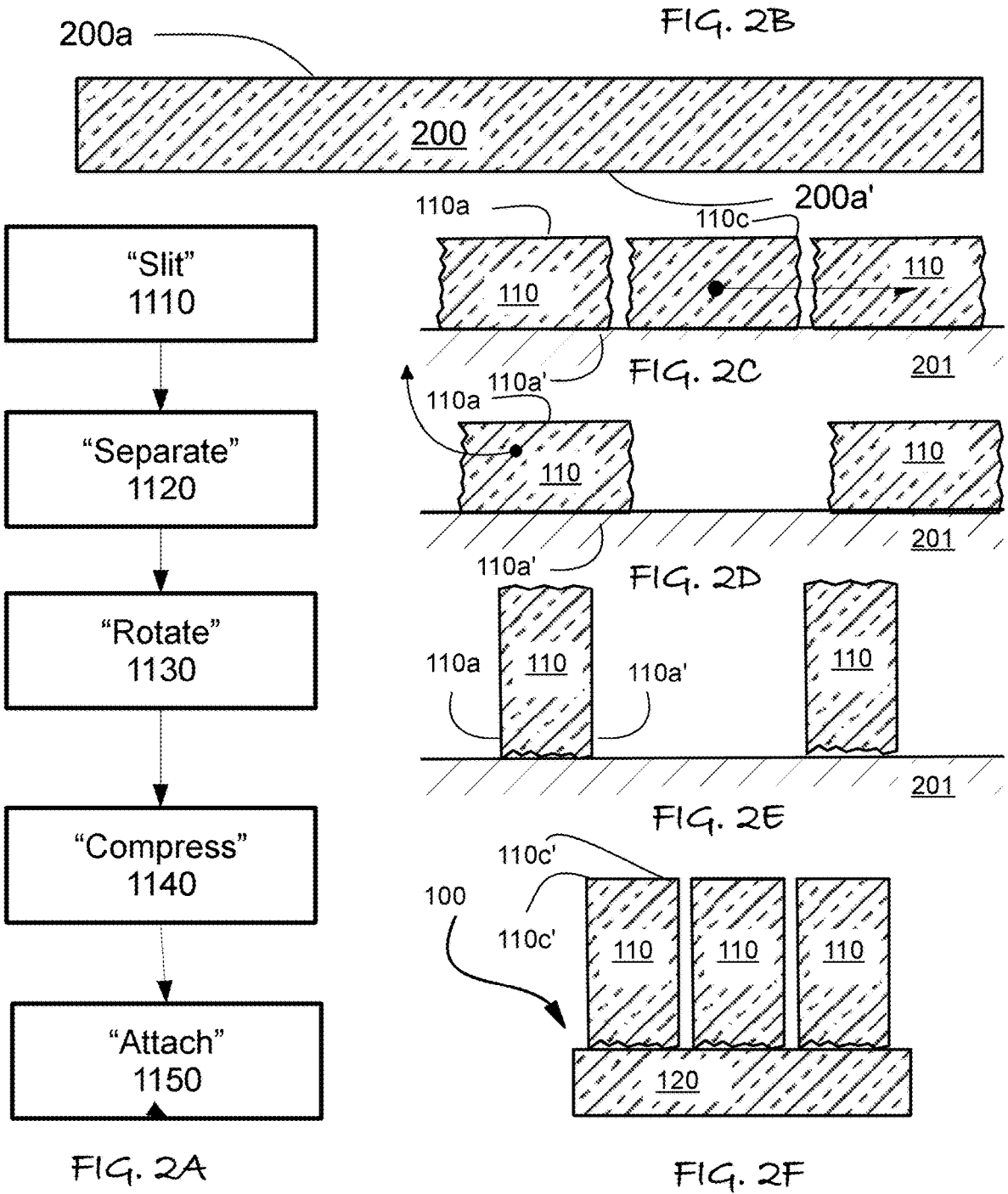

It should also be appreciated that the optical structure 100 is preferably a macro-structure, in which the TIR surface 110a and/or 110a' are spaced apart at a lateral pitch (in the surface plane direction of the component 100) generally equal to or wider than 0.5 mm. In the embodiment of FIGS. 1 and 2 the TIR surface 110a and 110a' are provided by gaps, g, and are disposed in normal direction to the surface of bar 110 supporting substrate 120. Additional aspects of the invention are such macro light directing structures with native TIR surface and methods of forming them, which may include methods of fabrication and structures with selective absorbing layers to make unidirectional TIR and additional features and sizes that reduce glare.

In a more preferred embodiment a transparent planar support member 120 connects the common surfaces 110b' on a first side of the bars 110 that is orthogonal to the native optical quality surface, and an adhesive material 130 that attaches the bars 110 to the transparent planar member 120 fills any optical imperfection of the first side 110b and 110b' of the bars 110 during the application or connection process to substrate 120 or 120' respectively.

The gap, g, is ideally as narrow as possible with respect to the width, w, of each bar, but in preferred embodiments the gap is preferably greater than about 1 to 2 μm to provide other benefits. The bars 110 have a height H, which is preferably at least about 5 mm to 1.5 mm, and preferably also have an aspect ratio of at least about 1.5:1, that is H/W is about 1.5 or greater and more preferably 2:1 and most preferably at least 3:1. The pitch, which equals the gap plus width, is preferably greater than 0.5 mm, but more preferably greater than about 1.0 mm to provide for ease of fabrication and improved optical performance in the most preferred embodiments. To facilitate handling and utilize very smooth cast acrylic resin sheet stock to minimize cost, a preferred stock sheet material can be selected, as the width, W, is the thickness of the stock sheet material used to produce the optical elements 110. Such stock sheet is commonly available in thicknesses of about 1 mm to about 30 mm so the slitting or cutting width provides the rough target height, H. A more preferred range of aspect ratio is 2:1 to 3:1. The various inventive assembly techniques/processes makes these high aspect ratios possible which are not readily obtainable in microstructures which utilize TIR optical constructions. Such higher aspect ratios, that is greater than about 1.5:1 are more desirable for efficiently re-directing low angle light that occurs farther from equator and in winter season when days are shorter.

Though expected to be a more expensive fabrication method, the TIR surface can also be replaced with metalized surfaces, in which case the gap, g, is not required. Further, in another embodiment when TIR or reflection is not desired at one or both interfaces 11a and 110a', light absorbing, i.e. black, layers can be applied to one or both opposing surface of the stock sheet material Such an embodiment that replaces both TIR or otherwise reflective interfaces, with an absorbing layer is illustrated in FIG. 21A.

The rods are generally polygonal optical elements 110 but are generally transparent solid polymeric bars that are optionally parallelograms (FIG. 9F) or the rectangles 110 as illustrated in the other embodiments. In other embodiments, illustrated in FIG. 18A-20B, the optical elements can have different shapes and can be made by molding or casting processes, rather than discrete assemblies.

The structure 100 in FIG. 1 may be converted to a more preferred embodiment shown in FIG. 2 by the application of a second transparent planar member 120', preferably with optical adhesive 130' to seal the open gaps creating air filled cavities 115. More preferably, the optical adhesive 130' is a pressure sensitive adhesive with sufficiently low viscosity and high tack to flow into and fill any indentations and deviations from smoothness on surface 110b during a laminating process. Such indentations and related roughness deviations which would otherwise detract from optical performance may be inherent in the method of fabricating rod 110, such as the cutting or slitting of sheet material, inherent in a surface formed directly by extrusion, or simply a remnant from a polishing or smoothing step. Such an adhesive can also be a thermoset or UV cure adhesive that solidifies after the application of the second transparent planar member 120'. However, in any case the viscosity of the adhesive should be sufficiently high that surface tension precludes the flow to the fill the gaps, g, which would preclude forming TIR surfaces on the lateral walls of the cavities 115. Further, the adhesive 130 or 130' should not contribute to the rounding of corners of the gaps, as this will contribute to glare, as discussed further below.

However, to the extent the reflective surface at 110a and/or 110a' is provided by metallic reflective layer, the gap g is not required, and the above restrictive consideration on the adhesive properties and application process may be relaxed. It is always preferred that the refractive index of the optical adhesive 130 and 130' be the same as at least one, and preferably both the optical elements 110 and the substrates 120 and 120'.

Preferably substrate 120 is relatively rigid to support the optical elements 110 in the spaced apart relationship that forms the gaps and surface 110a and 110a' to provide the light re-directing TIR surfaces. Hence, the transparent capping layer 120' can be thinner and more flexible than the supporting layer 120. However, in some application discussed below, it is more preferably that the substrates 120 and superstrate 120' have the same thickness. The superstrate 120' closes the gaps, g, to prevent contamination egress. However, when the reflective surfaces are metalized, the superstrate 120' is not required for this purpose. Metalized surfaces are reflective over a wider range of incident angles than TIR surface, and hence can have advantages in select applications, despite a potentially higher cost. A primary advantage of the metalized sides of optical elements surface 110a and 110a' is that the gap, g, can be eliminated, and the entire assembly can be bonded together. Another benefit is that when the optical elements 110 are parallelograms shown in FIG. 14B-F, metalized surfaces will be reflective under illumination conditions when the critical angle necessary for TIR would not be exceeded.

Line 10 In FIG. 2 traces the penetration of incident light ray 10 at a high angle of incident with respect to surface normal, N, of the surface 120a, illustrating the TIR that occurs at surface 110a', such that ray 10 exits the structure 100 in a reversed direction that is toward the lateral direction (i.e. sideways direction parallel with the plane of the window glazing), from which it entered.

In contrast line 10' traces the penetration of a light ray 10' at closer to normal incidence, showing the lack of any impingement on surface 110a or 110a', and hence transmission through structure 100 in the same lateral direction as the incident light. This illustrates the "see through" nature of this optical construction in which low angle incident light passes straight through.

Light re-directing films and sheets are well known and are generally formed by micro-fabrication methods in which the TIR surfaces are less than about 1 mm wide. Such microfabrication typically deploys micro-replication of a master surface or mold with which a resin impregnates the contours of the master surface so that upon curing and removal, the master surface is replicated in reverse. Some micro-replication methods are well suited to roll to roll processing of wide webs of flexible films. A web of flexible film can be readily slit and cut to custom sizes, as may be required for direct application to installed window glazing surface, or glass panels used to fabricate sealed glazing type windows. However, it has come to be appreciated that such micro-fabricated structures, have several performance limitations.

There are several limitations on the quality and shape of optical surfaces that can be made using micro-fabrication and micro-replication that results in performance limitations. One such limitation is in machining master molds used in resin casting, embossing or any molding operation, be it batch or continuous.

Further, as the structure of masters are usually produced by diamond turning, this adds further limitations to the shape, precision, and perfection that is necessary to optimize the efficiency of the TIR process. The diamond turning processes used to create master molds have limitations on the sharpness of corners.

Further, as the casting resin must fully fill the deepest features of the mold, and then release without distortion, there are practical limitation on feature aspect ratio and shapes to permit release of the sold cast film from the mold.

In general, the deeper the aspect ratio of a feature, the more clearance draft must be provided for consistent release from the molding without plastic deformation of optical features, which would cause optical distortions, or damage an expensive mold surface.

Aside from molding and process limitations, it has been observed that in many applications of micro-replicated structures on or adjacent to glazing or window surface there are annoying glare artifacts for occupants of the room interior. It has also been discovered that a source of some kinds of glare is the diffraction of light by the microstructures. As diffraction is wavelength dependent, white light will also be spectrally dispersed, which results in discrete color bands in the glare, as well as when the light is redirected, such as on a white ceiling.

It has been proposed that plastic panels can be converted to light re-directing sheets of transparent solid material such as acrylic in U.S. Pat. No. 4,989,952 (issued to Edmunds on Feb. 5, 1991), which is incorporated herein by reference. Edmunds discloses the use of a laser cutting tool to ablate plastic resin to create a pattern of slit or gaps in the sheet. However, the performance of these structures is limited by the width, or kerf, of the laser ablation process, as well as the poor optical quality of the TIR surfaces. The generally rough laser ablated surfaces are not smooth and thus scatter light, increasing glare related scatter, as well a diminishing see through transparency and the efficiency of directing high angle incident external light, that is generally sunlight, to the ceiling of the room. Further, when a laser ablation process is adjusted to improve smoothness it will also round corners, creating a large radius of curvature, as well as increase manufacturing times. As discussed below, rounded corners contribute to the glare in micro- and macro-structured light re-directing optical elements.

Figure 3:
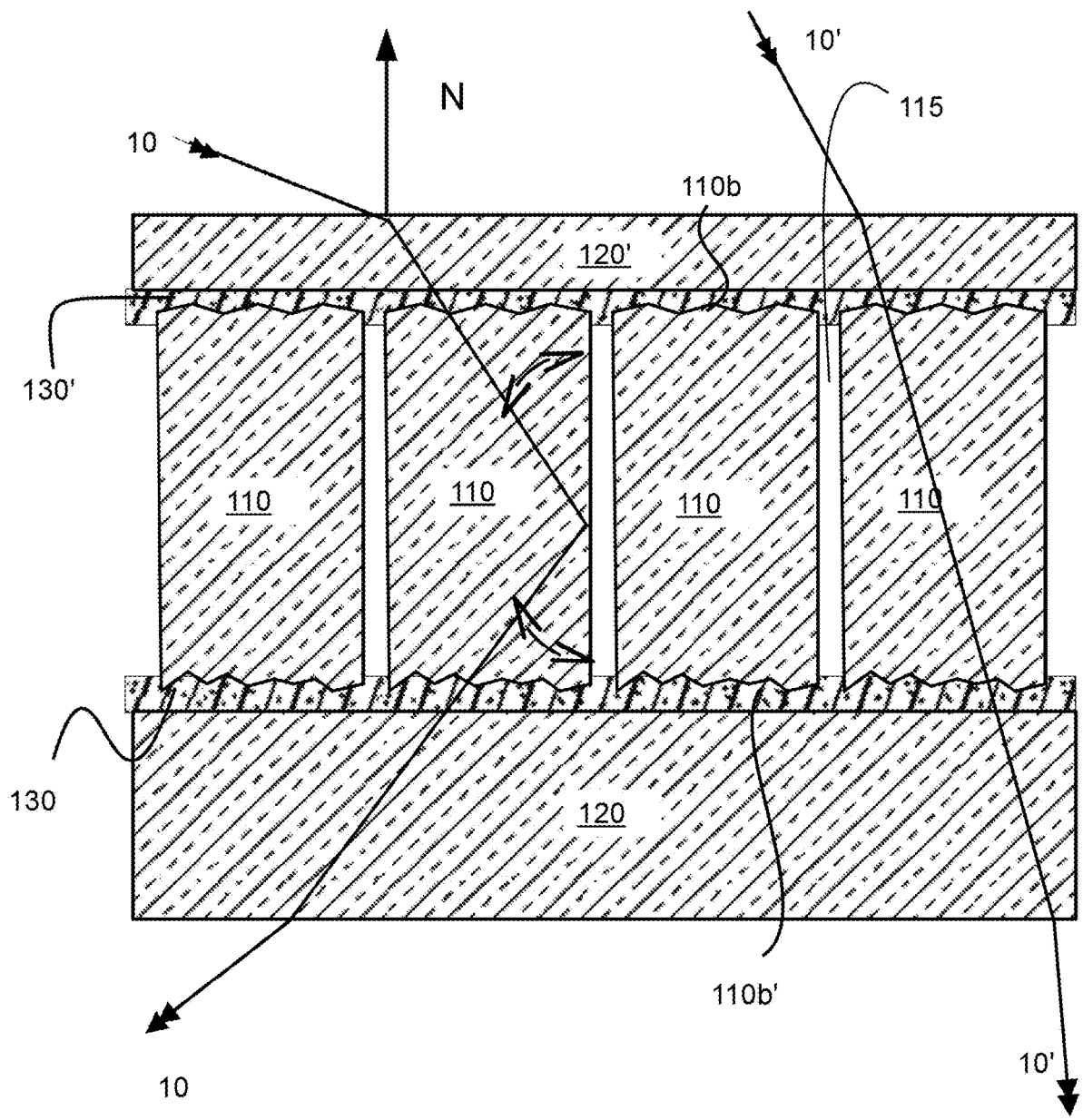
FIG. 3 is a schematic cross-sectional elevation of a second embodiment of a light re-directing structure.
Figure 4:
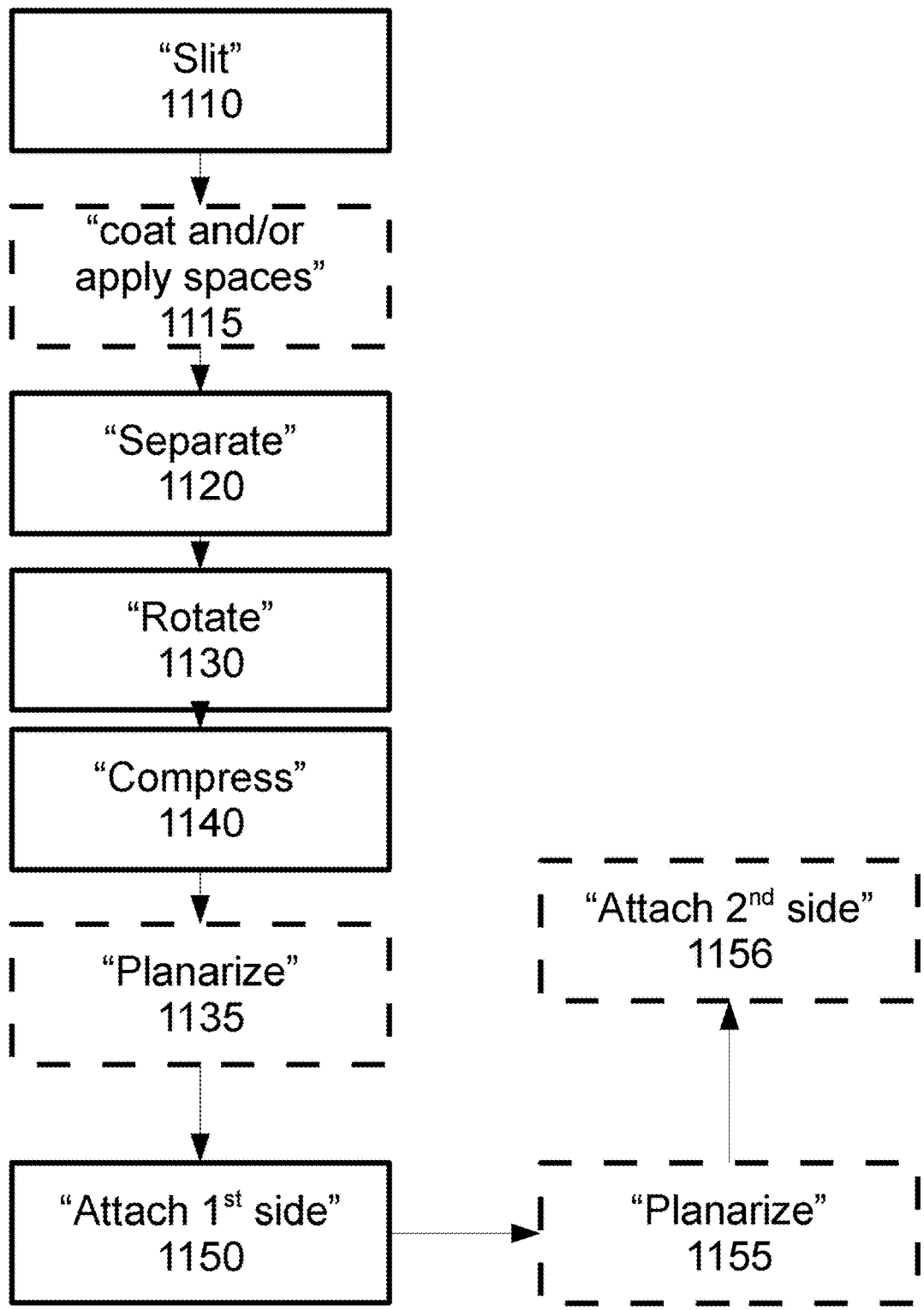
FIG. 4 is a flow chart to illustrate additional optional steps in fabricating different variants of the invention.

In contrast, the macro-fabrication methods illustrated in FIGS. 3, 4 and 9, as described below, will result in optical structures 100 that overcome the noted deficiencies of micro-structure fabrications to produce a more perfect structure that will also outperform any structure formed by laser ablation as noted above, or other assembly methods.

In the process of FIG. 3A, a sheet of optical quality material 200 (FIG. 3B), which is preferably UV stable acrylic resin, is slit (step 1100) to produce discrete rods 110 (FIG. 3C). The rods 110 have an upper and lower surface 110a and 110a' that is the same surface finish as the native surface 200a and 200a' of the sheet 200. However, the cut or slit surface 110b and 110b' are rough in comparison to the native surface 110a and 100a' due to inherent aberrations in removing material by any of the potential processes of slitting, which includes cutting, sawing, laser cutting, water jet cutting and the like.

In step 1120, adjacent rods 110 on a support surface 201 are separated (FIG. 3D) to leave a gap that enable step 1130 (FIG. 3D), in which each rod 110 is rotated 90 degrees so that the native optical surface 100a and 110a' are parallel to each other (FIG. 3E) and the surface normal to support surface 201.

It should be understood that the step of rotating 1130 can occur sequentially for each rod 110 in that a first rod's rotation is completed before the adjacent rod is rotated. Rotation can be accomplished robotically with a pick and place robotic arm, using micro-vacuum chucks and machine vision to identify, pick, lift and rotate each rod in sequence.

Similarly, the process step of separation 1120 can occur simultaneously or sequentially. Nothing precludes the sequential step of separation followed by rotation for each individual rod. The separation is necessary to allow room to place the rotated rod down between nearest neighbor rods in the array created by said step of rotation 1130.

Separation can occur simultaneously by advancing all or a selected group of rods forward between a set of v-shaped guiding wedges, or by advancing alternating rods forward. For example, one set of alternating rods can be advanced while the intervening alternating rods are restrained or advanced in the opposite direction. Rotation in step 1130 can be achieved advancing the separated rods (or alternating sets of adjacent rods) over a sideways curving form to initiate rotation of the advancing end, until the center of gravity is sufficiently displaced so that the entire rod topples onto the supporting surface with a 90 deg. rotation.

Alternatively, since the rods 110 (before rotation) are wider than their height, they can also be effectively rotated by vibrations that cause them to topple into narrow slots or channel while they are advanced forward.

Once the rods 110 that are intended to be consolidated to form the inchoate device in step 1140 are rotated (step 1130, 3D), they will have one of the surfaces 110b' formed in slitting step 1110 contacting the support surface 201, and the opposing surface 110b formed in the slitting step 1110 facing upward.

It should be understood that the rods 110 can also be moved between different support surface(s) 201, which are optionally vacuum chucks, and they can be rotated by 180 degrees by rotating a vacuum chuck 180 degrees, followed by release on a parallel underlying support surface 201, which is also optionally a vacuum chuck.

Moreover, once the rods 110 are rotated on a support surface 201 they can be laterally urged together in step 1140 of compression, to eliminate the space created in step 1120.

At this stage, shown in FIG. 3E, the rough surface 110b can be smoothed or planarized by several means. However, such step is optional depending on the ability to eliminate optical defects by filling flaws with an optical adhesive in the step 1150 of attaching all the optical elements to 120. Alternatively, extruded rods of clear plastic resin can also be planarized on one or more surfaces as needed, and then assembled in the same manner describe described herein. This would avoid the step of slitting large sheets.

Such planarization can be by machining, such as with diamond turning equipment, or a polishing step with abrasive or abrasive surfaces, depending on the hardness and micro-fracture characteristics of the material that the rods are formed of. Further, as the native optical surface 110a is very flat, the machining of the orthogonal rougher surface 110b and/or 110b' by diamond turning or cutting will result essentially in perfectly square corners, as the perfection of the corner is not limited by the groove cutting capacity of a diamond tool surface to cut a mold surface and/or the subsequent replication steps.

Preferably, in the macro optical elements 110, the corners 110c have a radius of curvature (ROC) of less than about 10 μm and more preferably less than about 5 μm and more preferably less than about 2.5 μm. More generally, the ROC if the corners 110c is preferably less than about 1% of the optical elements width, w, but more preferably less than about 0.5% and most preferably less than about 0.25%.

Prior to the step of attachment 1150, separated optical elements 110 are compressed or otherwise brought together to form the gaps, g, or in a further step of attaching 120', forming cavities 115. Such a gap may occur naturally by the long smooth waves in the native surface or by adding spacers 410 to at least one of the native surfaces 110a or 110a'.

However, in order to provide a high efficiency of light transmission, it is desirable to control the gap and make the gap relatively small with respect to the width, or the optical element pitch, which is the gap plus the width. Table I shows the decrease in efficiency loss as the width is increased for a constant gap of 0.025 mm (25 microns).

TABLE 1

| Sheet thickness/optical element width, w (mm) | Gap, mm | Efficiency loss, % |
| --- | --- | --- |
| 1.5 | 0.025 | 1.6 |
| 2.0 | 0.025 | 1.2 |
| 2.3 | 0.025 | 1.1 |
| 2.5 | 0.025 | 1.0 |
| 3.0 | 0.025 | 0.8 |

The optical elements 110 preferably have at least a 2:1 aspect ratio, but more preferably 2.5:1 and most preferably at least about 3:1 or greater. As the sheet thickness, which provides the width, increases fewer elements are required to assemble a discrete optical structure 100 of a given width. However, the higher aspect ratio requires, making the resulting optical structure 100 thicker for any given width, as shown in Table II below:

TABLE 2

| Sheet thickness/ optical element width, w (mm) | No. elements in 50 mm wide slat | Integral No. of elements | Slat width (mm) | Height (mm) for 2:1 aspect ratio | Height (mm) for 2:5 aspect ratio | Height (mm) for 3:1 aspect ratio |
| --- | --- | --- | --- | --- | --- | --- |
| 1.5 | 33.3 | 34 | 51 | 3.0 | 3.8 | 4.5 |
| 2.0 | 25 | 25 | 50 | 4.0 | 5.0 | 6.0 |
| 2.3 | 21.74 | 22 | 50.6 | 4.6 | 5.8 | 6.9 |
| 2.5 | 20 | 20 | 50 | 5.0 | 6.3 | 7.5 |
| 3.0 | 16.67 | 17 | 51 | 6.0 | 7.5 | 9.0 |

It should be noted that the slat 600 referred to in Table 2 is a long but narrow optical structure 100 with a preferred width of about 50 mm for use in a louver assembly described further below with respect to FIG. 8A-C, among others.

FIG. 4A-E illustrates a more preferred fabrication process for a variant of optical structure 100 in which only one of surfaces 110a and 110a' provide TIR. It should be appreciated that the step of rotating the optical elements 110 shown in FIG. 3D, permits the application of a coating or finish 405 that suppresses TIR on surface 110a, as shown in FIG. 4C.

The coating or finish 405 can simply be a layer of a black paint or resin coating, as is commonly applied to all the upward facing surface 110a before rotation by 90 degrees as shown in FIGS. 4D and 4E. While the coating 405 can be applied after sitting at the stage of FIG. 4B, it is preferable to apply coating 405 to the entire planar sheet 200, on surface 200a, before the slitting step 1110.

Further, to facilitate the establishment of uniform width gaps, the structure 100 in FIG. 4E deploys spacers 410 between adjacent optical elements 110. The spacers 410 can be applied in the same, prior or subsequent step to surface 110a as the absorbing layer coating process, or without the absorbing layer coating process. While the spacers 110 can be applied after sitting at the stage of FIG. 4B, it may be preferable to apply spacers 410 to the entire planar sheet 200, on surface 200a, before the slitting step 1110. Alternatively, the spacers can be applied to surface 200a, either before or after slitting. Spacers 410 can be deployed as shown in FIG. 4E without absorbing layer 405.

Hence, after the step of rotating, shown completed in FIG. 4D, in the subsequent compression step 1140 the spacers 410 limit the gap width g. The spacers 410 should be applied at a low density that is sufficient to provide a uniform gap. It should thus be recognized the illustration of a spacer 410 in each gap is merely to aid in understand the function of the spacers 410, as it unlikely any actual cross-section of a preferred embodiment would show spacers 410 within each gap.

In the final step illustrated in FIG. 4E, the optical elements or bars 110 are supported on at least one common planar surface by a transparent support member 120 with an optical quality adhesive material 130 filling any imperfection in the bars 110 common planar surface that form in fabrication. However, planarizing can occur on a support substrate 201, shown in FIG. 4D.

A currently preferred process is to slit the sheet 200 by sawing with diamond wire blades and planarizing a surface 110b and/or 110b'.

Figure 5:
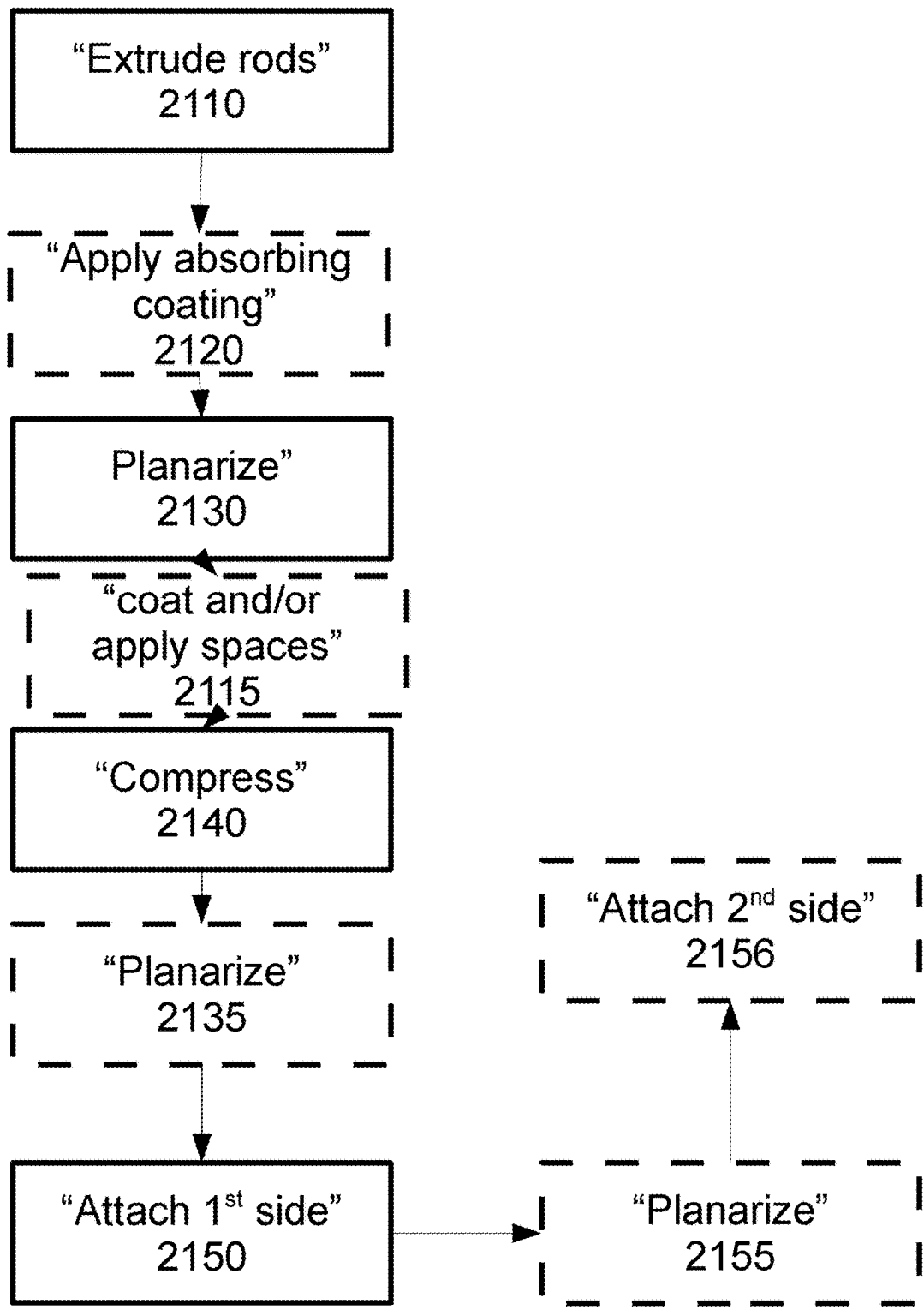
FIG. 5 is a flow chart to illustrate an addition process to form the optical elements.

FIG. 5 is a flow chart illustrating a selection of the alternative process steps to fabricate a range of alternative embodiment of the invention, such as the process illustrated in FIG. 4A-4E and FIG. 14A-F.

It should be noted that Step 1115 of applying spacers and/or a coating to eliminate alternating TIR surface may occur before or after slitting in step 1110. Alternatively, step 1115 of applying spacers and/or a coating can also be after step 1135 of planarizing. To the extent it is desirable to reduce glare by applying a light absorbing coating layer, such as a paint or ink, to the corner of 110a (or 110a') and 110b (or 110b') this can be done before rotation and/or before planarizing, with planarizing used to remove excess coating from the area of a face adjacent to such a corner.

Similarly, the optional step of planarizing 1135 can occur before or after the step of compression 1140, however to the extent the planarizing method produces debris, it is preferable to planarize after the step of compression 1140 to minimize the potential for debris entering the gap.

A second planarizing step 1155 on the reverse surface from that planarized in step 1135 can occur before or after compression in step 1140, but preferably occurs after compression and attachment of 1st side to a substrate in step 1150 to facilitate the movement and rotation of the entire array of rods 110 to the planarizing work station by moving a substantially rigid member, such as the optical structure 100 shown in FIG. 4E.

To the extent the slitting is done by a laser ablation process that produces rounded corners 110c on optical elements 110 (FIG. 3C) it is preferable to deploy the planarizing process steps 1135 and/or 1155 in FIG. 5 to reduce the radius of the corner to be less than 1% of the optical element spacing, that is the width plus the gap thickness, and more preferably less than 0.5% of the element spacing or pitch. Such a squared corner 110c' is illustrated in the optical structure 100 of FIG. 3F.

Figure 22:
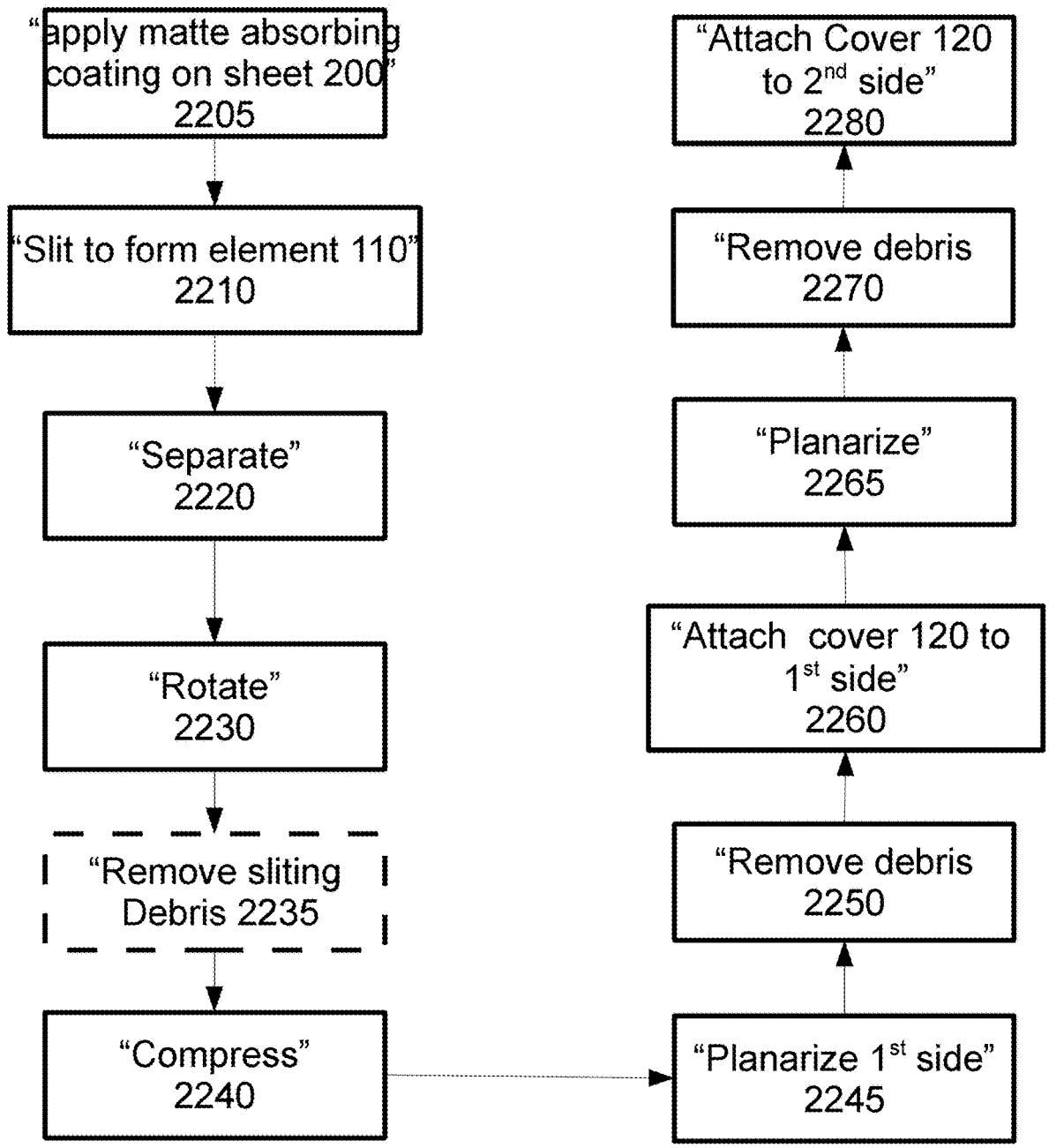
FIG. 22 is a process flow chart for a more preferred embodiment of the invention in which a high aspect ratio slat is formed.
Figure 23:
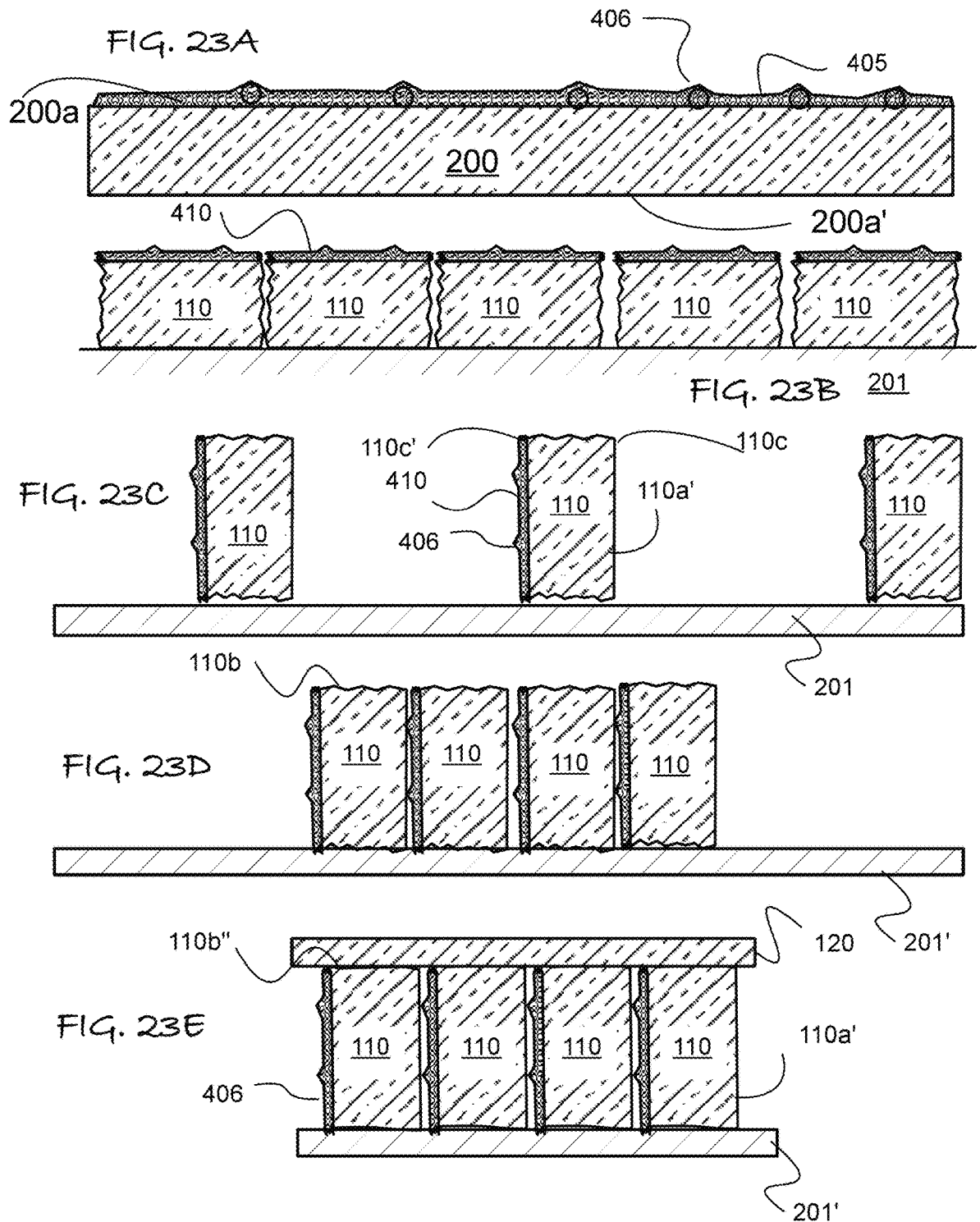
FIG. 23A-23E illustrate the transformations that occurs in select steps of the process of FIG. 22
Figure 24:
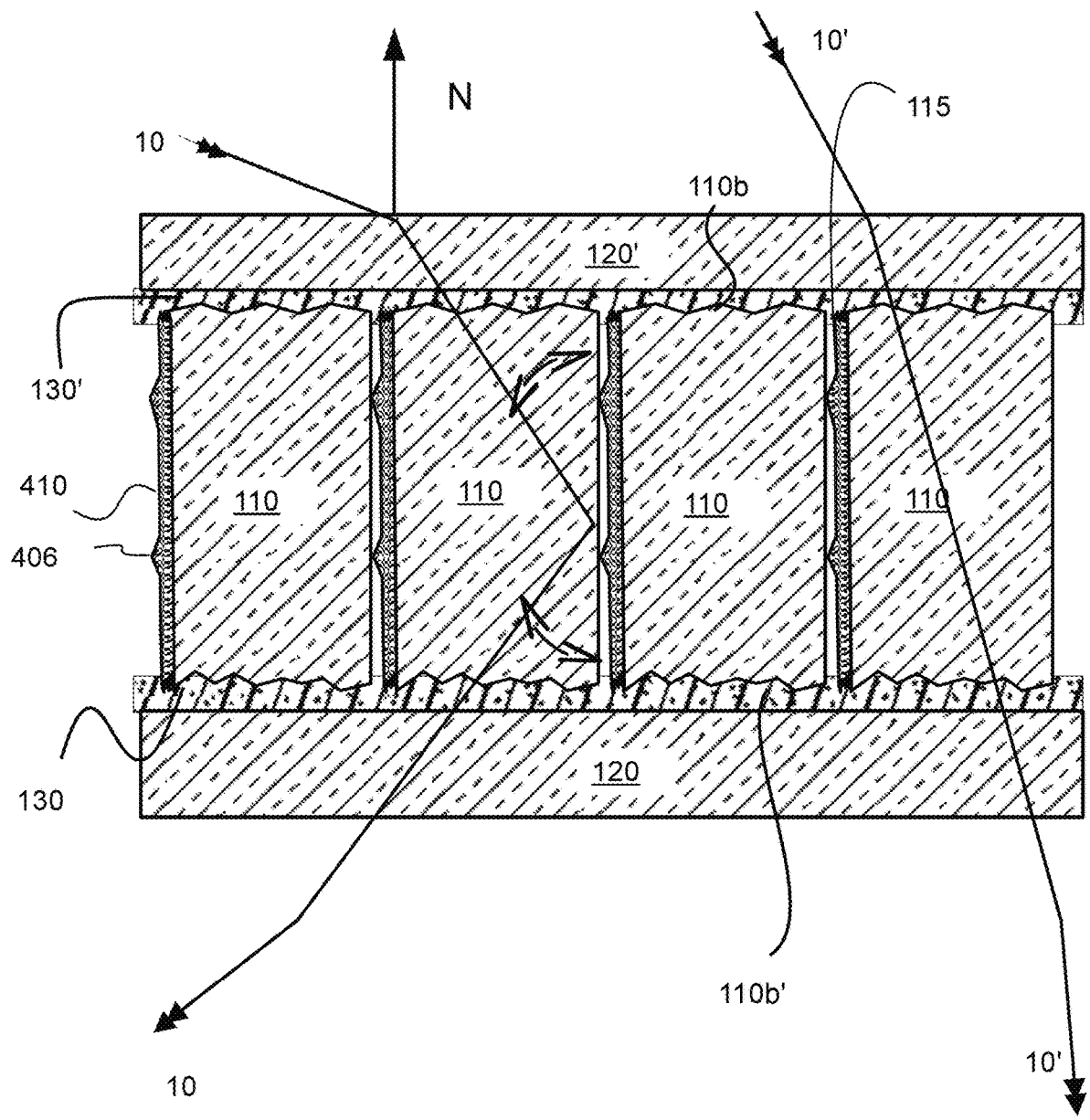
FIG. 24 is a cross-sectional elevation of the resulting structure of the process of FIG. 22.

The flow chart of FIG. 22 provides an overview of a more preferred embodiment of a process for creating the High Efficiency Daylighting Structure 100 that is particularly suitable for ultimate use a high aspect ratio slat 600. In step 2205, a sheet of optical quality material 200 (FIG. 23A), with opposing parallel native optical surface, which is also more preferably a UV stable acrylic resin, is coated with an absorbing layer 405, optionally by any method previously described. The absorbing layer 405 is preferably a black or grey material but option such a colored paint with matte finish paint that provides well dispersed or sharp peak 406. A non-limiting example of such a paint or coating is the Rustoleum™ brand 2× ultra cover matte spray paint. In matte paint the peaks 406 will be produced by fillers that disturb the surface flatness so that the dry paint is no longer specular in its surface reflection. The peaks 406 act as spacers or separators when the rods, bars or optical elements 110 (formed by slitting or cutting in the normal direction in step 2210) are compressed in step 2240, after the separation in step 2220 and rotation in step 2230. The absorbing layer or paint 405 should be thick enough, based on its optical absorption coefficient, to reduce the reflection at the TIR critical angle by a factor of about 10, but more preferably at least 100, from native surface 110a or 110a' (which remains uncoated). The layer 405 can consist of multiple sub-layers to create the desired optical absorption to reduce reflection, with the final layer having the desired particles to produce sharp but widely space peaks 406 that act as spacers of surface 110a' from the portion of layer 405 between peaks 406. The resin used to form the paint or coating of layer 405 should closely match the refractive index of sheet 200 to minimize interfacial reflections.

In step 2235 of slitting or cutting debris are optionally removed from each of the surfaces 110c and 110c' either before or after compression, or after the compression of the assembly of rods or elements 110 is planarized on a 1st side in step 2245. FIG. 23C shows the rotated separated bars or optical elements 110 on a generic support 201. They are compressed together in FIG. 23D in which the peaks 406 provide a spacing of surface 110a' from layer 405.

The rod or bar 110 assembly (FIG. 23D) is compressed and held in a vacuum chuck as support surface 201' for each of the steps of planarizing (2245 and 2260 in FIG. 22) to reduce the potential for waviness in the final light redirecting structure 100. The waviness is then essentially eliminated when the cover 120 is an optical quality polyester film with a thickness of at least about 15 mills, but more preferably 20 mils. FIG. 23E shown the optical quality polyester film 120 applied to the common planarized upper surfaces 110b of bars 110 after step 2260. After which, in the more preferred embodiment, the assembly is flipped so the vacuum chuck 201' holds layer 120 and the second surface or reverse surface 110b can be planarized (step 2265), cleaned of debris (step 2275) and a second optical film layer 120' adhered to this second planar side, resulting in the final light re-directing structure 100 of FIG. 24.

The planarizing in steps 2245 and 2260 are preferably by diamond turning while the compressed rod assembly is held in the same type of vacuum chuck 201. Debris are preferably removed in steps 223, 2245 and 2250 by a tacky rolls that is rolled over the rotated rods, their compressed assembly, or their planarized compressed assembly (steps 2245 and 2265

Hence, after separating in steps 2200 and rotating in step 2230, each absorbing layer 410 (from coating 405) provides the peaks 406 that serve as spacers after compression in Step 2240. The rods or bars 110 have a lower surface 110a' that is the same surface finish as the native surface 200a' of the sheet 200. However, the cut or slit surface 110b and 110b' are rough in comparison to the native surface 110a and 100a' due to inherent aberrations in removing material by any of the potential processes of slitting, which includes cutting, sawing, laser cutting, water jet cutting and the like.

Hence, after separation in step 220, adjacent bars s 110 on a support surface 201 are separated (FIG. 23C) to leave a gap that enable step 2230 (FIG. 23D), in which each rod 110 is rotated 90 degrees so that the native optical surfaces 110a' of adjacent rods 110 are parallel to each other (FIG. 3E) and the surface normal to support surface 201. It is important that layer 405 be applied at a relatively uniform thickness so that the absorbing layer 410 on each rod or element 110 does not distort or reduce the parallel orientation of the surfaces 110a' after compression in step 2240.

It is also important that at the compression level in step 2240, only the peaks 406 in layer 410 contact the adjacent surface 110a', so that the effective TIR from surface 110a' is preserved. The peaks 406 should be widely dispersed but have a height and width that A currently preferred method of planarizing is diamond turning, as it results in a flatness over a length that is suitable for use of light re-directing structure 100 as a slat 600 as louvers and provide a final surface character that is capable of being covered by optical quality pressure sensitive adhesives 130 when laminating the cover 120. More specifically, the diamond turning process of for example, steps 2245 and 2265 reduces the roughness to a peak to valley height of about 1-3 microns. A currently preferred mode of planarizing is with a 1.5 mm radius diamond cutting tool rotating at 2500 RPM at a 3 inch radius in the milling spindle. Further the federate of the cutter is preferably about 3 to about 6 inches per minute. Such planarized surfaces have a milled contour of over lapping radius sections, or cords of a circle, which are smoothly cut from the diamond edge. When the diamond turning debris in the form of micro-chips are removed in each of steps 2250 and 2270, the remaining clean surface preferably have a peak to valley variation of less than about 7-10 microns, more preferably less than about 3-6 microns, and most preferably less than about 1-3 microns.

Preferably, in steps 2260 and 2280 a transparent skin or cover 120 with optical adhesive 130 is attached by roller laminating to surface 110b and 110b' while the compressed rods or bars 110 remain in the same vacuum chuck 201' used for planarizing after compression.

It has been discovered that an at least 15 micron thick skin or cover 120 on each side of the optical elements 110 will then maintain a slat 600 with an aspect ratio of at least 12, and more preferably at least about 24 in a stable and flat condition for use in an array of louvers placed in front of a window.

It has been discovered that the by laminating the skin like cover 120 using attached pressure sensitive optical adhesive 130 immediately after fly cutting as above while bars 110 are held by a vacuum chuck and side clamp yields outstanding lamination quality as step heights from bar to bar that are well below 5 µm.

Maintaining the bar like optical elements 110 in an edge clamping jig from compression step 2240 during the steps 2245 and 2265 of planarization, with subsequent removal of planarizing debris with tacky roller pads (steps 2250 and 2265) through lamination (steps 2260 and 2270) of the covers 120 with a pressure sensitive optical adhesive 130, eliminates a tendency for the bars or optical elements 110 to misalign in wavy patterns in a high aspect ratio slat 600.

However, while a high clamping pressure in step 2240 is desired to facilitate these processes, the lamination pressure can also cause the contact or mating of the native surfaces 110a to 110a of adjacent logs, destroying the air gaps needed for TIR. Hence, it is desirable to provide a form of spacer, such as a matter paint coating 405 one of surface 110a and 110a' before compression in step 2240, as the surface has peaks 406 that maintain a gap for TIR with minimum full contact with the TIR surface which regions of coating 410 between these peaks 406.

FIG. 6 is a flow chart illustrating a variety of alternative process steps (corresponding to FIG. 7A-C) to fabricate an alternative embodiment of the invention, shown in FIG. 7C.

In FIG. 7D, the optical elements 110 have corners 110C covered by an optical absorbing layer 113 to minimize glare from rounded corners. The structure is created by extruding (step 2110 in FIG. 6) the near optical quality rod shown in FIG. 7A, which has rounded corner 110c and optionally rounded sides 110a and 110b. In FIG. 7B, corresponding with step 2120 in FIG. 6, the corners 110c are covered or painted with a black coating or pigment 113. While the blackening steps are optional, to the extent that the rod is extruded, planarizing of at least 3 sides is required to remove surface roughness from extrusion as well as rounded corners.

In step 2130 in FIG. 6, the sides 110a/a' and optionally 110b/b' are planarized to provide native quality optical surfaces for TIR. As shown in FIG. 7C, The planarization removes the excess absorbing coating 113 from all sides but the corners. The optical elements may be assembled and attached to substrate 120 as well as superstrate 120' by any of the processes described elsewhere, and such planarizing can occur on one or more sides before or after attachment to the substrate 120 or superstrate 120', or on a support surface 201.

FIG. 8A illustrates a configuration of the optical light re-directing structures 100 into louvers 600 that are adjustable in angular rotation to vary the penetration of daylight in accordance with the time of day and season, as well as room use. The louvers 600 are essentially flat blades or slats that are adjustable from a parallel horizontal orientation (FIG. 8B) to an at least partially vertical stacked orientation by collective rotation, such as via an axle, hinge or supporting member via a common actuator 620 (FIG. 8C). Alternatively, the slats can nominally be at near vertical orientation for maximum light re-redirection of the high angle sunlight, and adjustable to the horizontal orientation to re-direct light differential during the day, or to move to a fully open position in FIG. 8A, such as on a cloudy day, when the sun is blocked by other building, trees or is simply at a time of day and year when the window is not directly illuminated by the sun. The rigid nature of the support substrate or base 120, and preferably superstrate 120' as reinforced by the macro elements 110 results in an I-beam like construction to provide the rigidity to maintain the narrow louver optical flatness over its lateral span, which can be as high as 20 to 50 or more times the width. The width is preferably about 20 to 100 mm, and more preferably about 50 mm. Further, the method of collectively slitting, rotating and adhering a bar shaped portion of a larger planar sheet to a sufficient number of rods 110 to form the louver width facilitates the louver manufacturing process. In such a process the tool for manipulating a set of rods 110 need only handle enough rods or optical elements 110 to provide the width of the louver 610. Further, having substrates and superstrates 120 and 120' of the same thickness provides a rigid structure resistant to thermal induced distortion from differential thermal expansion. The slats 600 also are preferably at least about 4' (48" or 1200 mm) in the horizontal direction (into the plane of the paper in FIGS. 8B and 8C) for forming practical length window coverings. Hence, the slats 600 when formed of the desirable thickness sheet for fabricating rod shaped optical elements 110 of the proper aspect ratios, will themselves have aspect ratios of 24 ef or greater (1200 mm length divided by 50 mm width). As the slats 600 should not have a permanent bends, warps, buckles or twist over this length, this presents particular challenges in fabrication from light weight and relatively flexible polymer or plastic materials, in comparison to much heavier glass materials.

A preferred high efficiency daylight re-directing structure 100 for application on or in optical communication with window glazing and related fenestration deploys closely spaced macroscopic bars 110 of transparent resin can eliminate different forms of glare when specific combination of dimensions are provide as described further below. The minimally spaced apart surfaces 110a and 110a' provide for efficient reflection, and preferably TIR of selective incident light via the ultra-smooth native surfaces from a mold or casting process, or a metalized smooth surface. Further, the efficiency of redirected light in TIR is achieved by minimizing the gap in between individual macro elements—this allows a greater percentage of light to enter each individual element and undergo TIR re-direction. A close spacing is readily obtained in various attachment methods to boost efficiency. The fabrication method allows selective deposition or painting/printing of absorbing layers between alternating native optical surfaces to provide a non-symmetrical re-direction of light at high angles of incidence. In daytime hours, solar illumination from above is re-directed toward the ceiling. However, at night bright lights from below, such as headlights of vehicles and street lamps, will not enter the of the room interior structure; as the absorptive layer precludes TIR by absorption of light coming from below the horizon that hits the top absorptive layer. Further, as these absorptive layers also kills TIR for multiple bounces from very high elevation angles; this lowers glare as well as nuisance lighting from below, like headlights and street lights below a window in a high rise. See-through transparency is still maintained to the extent the observer is looking parallel to the absorbing layers, gaps and/or metalized layers. It should be appreciated that such absorptive layers can be deployed when a metalized layer replaces the TIR surfaces at the gaps.

It has been discovered that the inventive structures disclosed herein have several significant performance benefits compared with micro-prismatic and related microstructure that provide TIR of incident light for re-directing incident light to the ceiling.

Figure 10A:
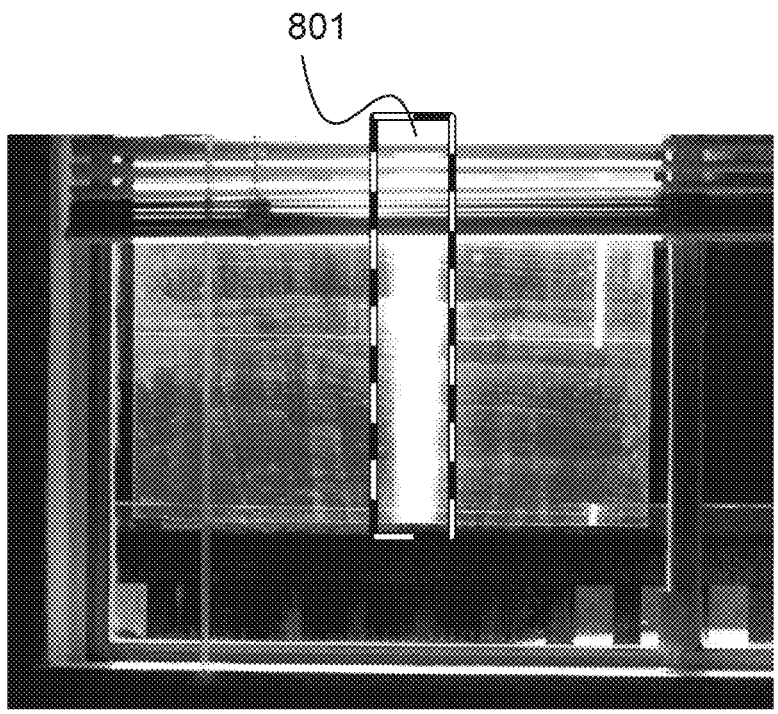
Figure 10B:
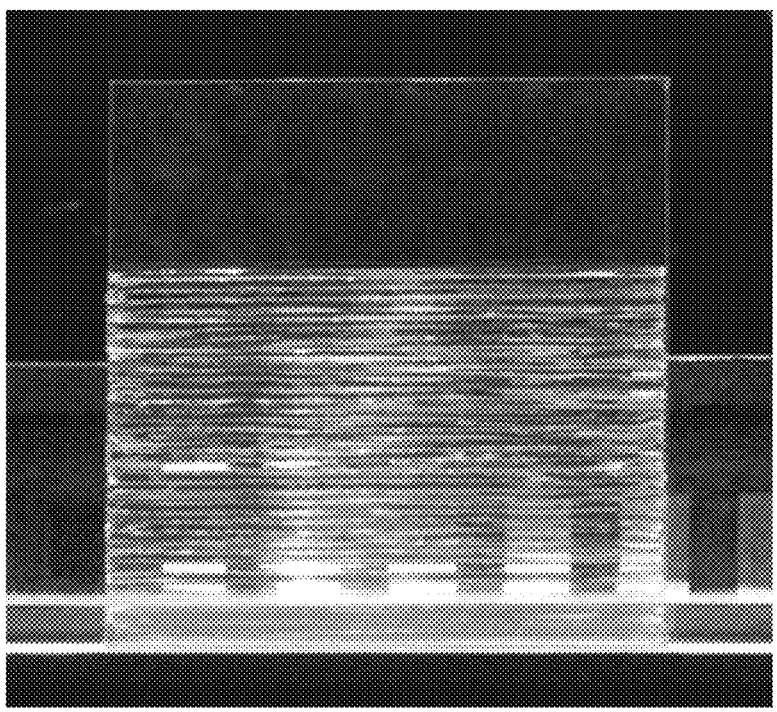
FIG. 10B illustrates the glare reduction achieved with an embodiment of the current invention for high sun angles.

Prior art daylight re-directing films for glazing structures typically include micro-louvers/prisms, which have small finite dimensions. Such structures will also strongly diffract light at louver/prism interfaces because the entrance/exit apertures are small, typically less than about 200 µm (0.2 mm). These small openings and finite boundaries scatter/redirect light in unintended directions. When these rays are directed into the eyes of an occupant in the room interior, at a high relative intensity with respect to other light sources, it is considered glare. A particularly distracting and annoying form of glare is observed as a narrow column of light which is very bright and objectionable, and is referred to as "columnar glare". This columnar glare occurs in a vertical plane which includes the sun, the observer's eyes, and the intersection or the former two items with the film, and manifests itself as a high intensity stripe 801 on the window covering structure, as is shown in the photographs of FIG. 10A. It has been discovered that such columnar glare is significantly reduced by the preferred embodiments of the invention in which the TIR or metalized reflective surfaces 110c are generally larger than about 500 µm (0.5 mm) and preferably larger than about 1.5 mm. It has also been discovered that rounded or non-square corners 110c in the structure 100 contribute to such columnar glare. FIG. 10B illustrates the reduced glare in an embodiment of the invention, in comparison to the bright stripe observed in a prior art example micro-structure in FIG. 10A.

Diffraction in see-through microstructure also produces color banding in multiple order of the diffracted beams, as shown in the photograph in FIG. 9A-B. Color banding can best be eliminated when the pitch of the individual array elements is macro scale, circa 0.5 mm or greater, and the corners of the TIR or reflective surfaces have a radius of curvature of less than about 0.5% of the element spacing/pitch. If the corners have a larger radius of curvature, glare can be eliminated by making the rounded or otherwise non-square surfaces absorbing. It should be appreciated that the preferred methods of fabricating such structure either provide sharp corners, or permit selective blackening of the corners.

Figure 11A:
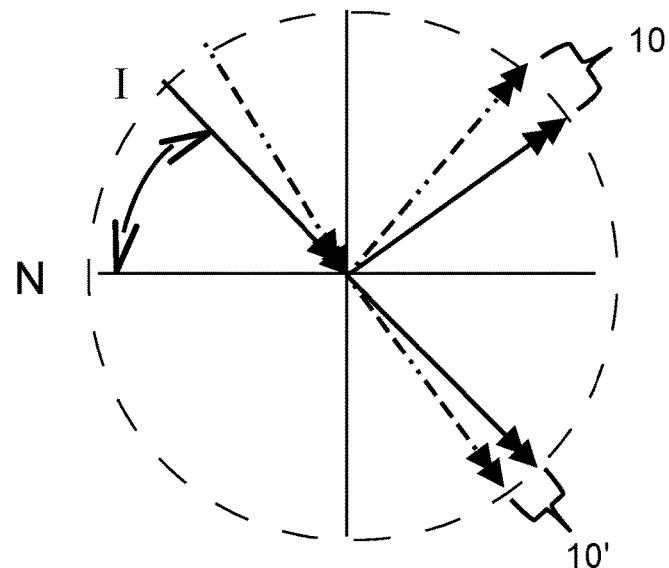
FIG. 11A illustrates the optical modeling geometry applied to analyze the glare and diffractive effects of the different size versions of the optical component in FIG. 11B, to generate the graphs of FIG. 12A to 12D.
Figure 11B:
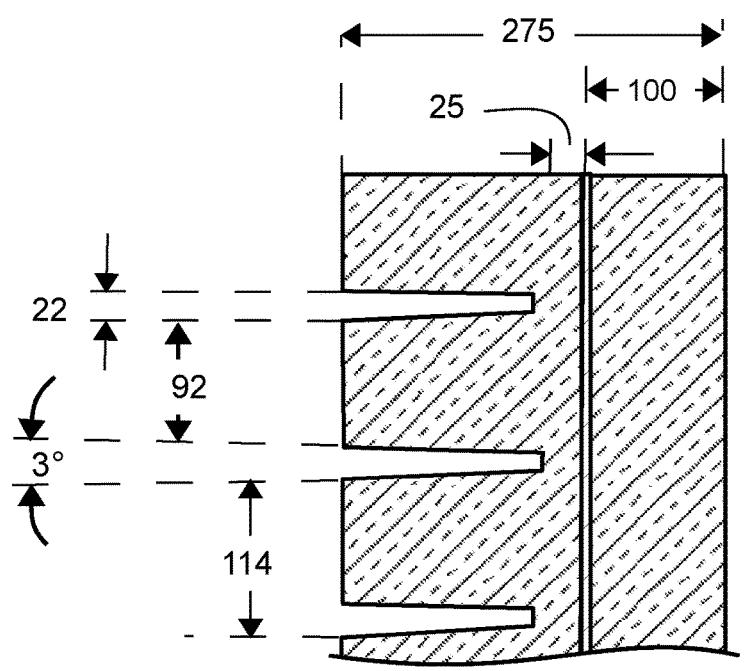

FIG. 11A illustrates the optical modeling geometry applied to analyze the glare and diffractive effects of the different size versions of the optical component in FIG. 11B, to generate the graphs of FIG. 12A to 12D. The modeling deployed ray tracing of an incident beam, I, having a width of 9 µm and a height of 32 mm, in which the height is orthogonal to the grooves that define the TIR surfaces or light reflecting surfaces. All the rays within the incident beam are parallel when impinging on the light re-directing structure of FIG. 11B, at the illustrated scale, as well as 10× and 20× larger. The optical element in FIG. 11B is also disclosed in US Pat. Appl. No. 2014/0133030A1, which published on May 15, 2014, and is incorporated herein by reference.

Figure 12A:
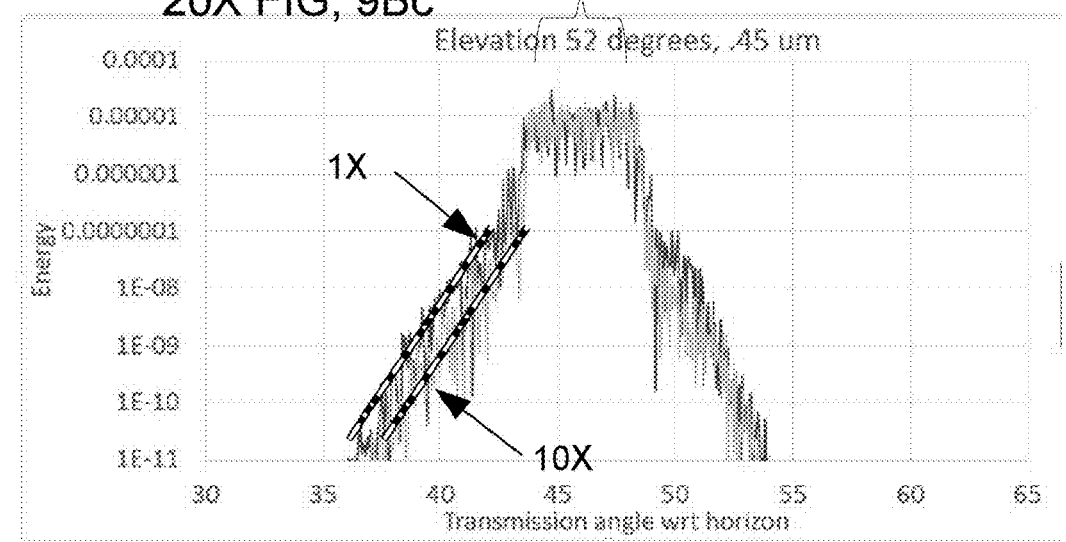
FIG. 12A compares the energy of the re-directed transmitted beam from FIG. 11A over a wide angular range resulting from the optical component in FIG. 11B with a 10× larger structure, whereas FIG. 12B compares the FIG. 11B structure to a 20× larger structure.
Figure 12B:
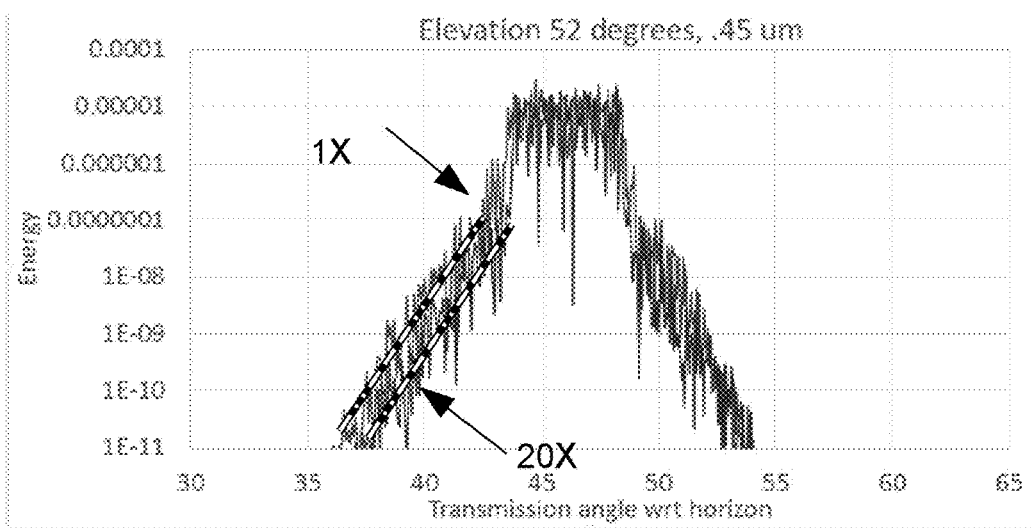

FIGS. 12A and 12B show the computed angular spread of the re-directed transmitted beam that resulted from incident beam (I), shown as the left most arrow in FIG. 11A, being at 52 degrees from normal incidence (N). Note the x-axis of the graph shows a range of transmitted angle from 30° to 65°. The relative energy in the beam is plotted on a log scale on the Y-axis against the angular range of redirection on the X-axis. There is an intense middle beam from about 43° to about 54° with wings of 100× lower intensity. While the intensity in these wings oscillates, the general trend (indicated by the black and white broken lines) is a linear decrease intensity (on the log scale) as the angular separation from the middle beam increases. It should be noted in comparing the 10× and 20× structures to the 1× scale structure of FIG. 11B, these wings about the middle beam have a lower intensity at the larger macro scales, where the pitch is greater than 1.14 mm (1140 microns). Lower intensity away from the main redirected beam reduces one source of glare caused by diffraction.

FIG. 13A-D show the same data as in the 12A and 12B plots, with a much narrower angular range on the X-axis, circa 42° to 49°, to better illustrate the color separation caused by the diffraction in the main beam. More specifically, the color dispersion of each structure at 1× (FIGS. 13A and 13B), 10× (FIG. 13C) and 20× (FIG. 13D) is shown by plotting the intensity at the wavelength of 450 nm (0.045 microns), 550 nm (0.055 microns) to 650 nm (0.065 microns), corresponding to blue, green and red light. The spread of the main beam over an angular range of about 44 degrees to about 48 degrees due to aliasing, which is the offset that occurs from TIR, as the incident beam is collimated.

While the intensity oscillates within this angular range as a function of angle, the different colors corresponding to the plotted wavelength essentially overlap in the 10× and 20× size structure. In contrast, as shown in FIG. 13A and the enlarged portion thereof as FIG. 13B, for the 1× structure, each color has a peak offset from the other colors, which manifests itself as the color banding shown in FIG. 9A, illustrated in color labeled black and white hatching patterns in FIG. 9B (which corresponds to 3 color bands in the broken line box in FIG. 9A). The bright white vertical line in the center of the color bands is the main beam, which resulted from reflections of the sun off of car headlamps.

FIG. 14A-F illustrates the steps of processes in FIG. 5 as applied to form a light-redirecting structure 100 in which the TIR surfaces 110a are tilted with respect to the normal surface vector of the supporting substrate 120, and optionally includes the light absorbing surfaces 410 on the alternating potential TIR surfaces 110a', in which sides 110a of elements 110 remain TIR surface. It should be appreciate the tilted surface 110a do not always provide TIR, as light can enter at angle in which TIR would not occur, whereas in other embodiment with surface normal directed TIR surfaces, the aspect ratio of the optical elements 110 can be such that only incident light that meets the TIR conditions will enter and impinge on TIR surfaces 110a and/or 110a'. Accordingly, in this embodiment it may be preferable to replace the TIR surfaces with metal reflective surfaces, as described below with respect to other embodiments. Further, the absorbing surfaces 405 and spacers 410 are optional in this embodiment.

Figures 15A, 15B:
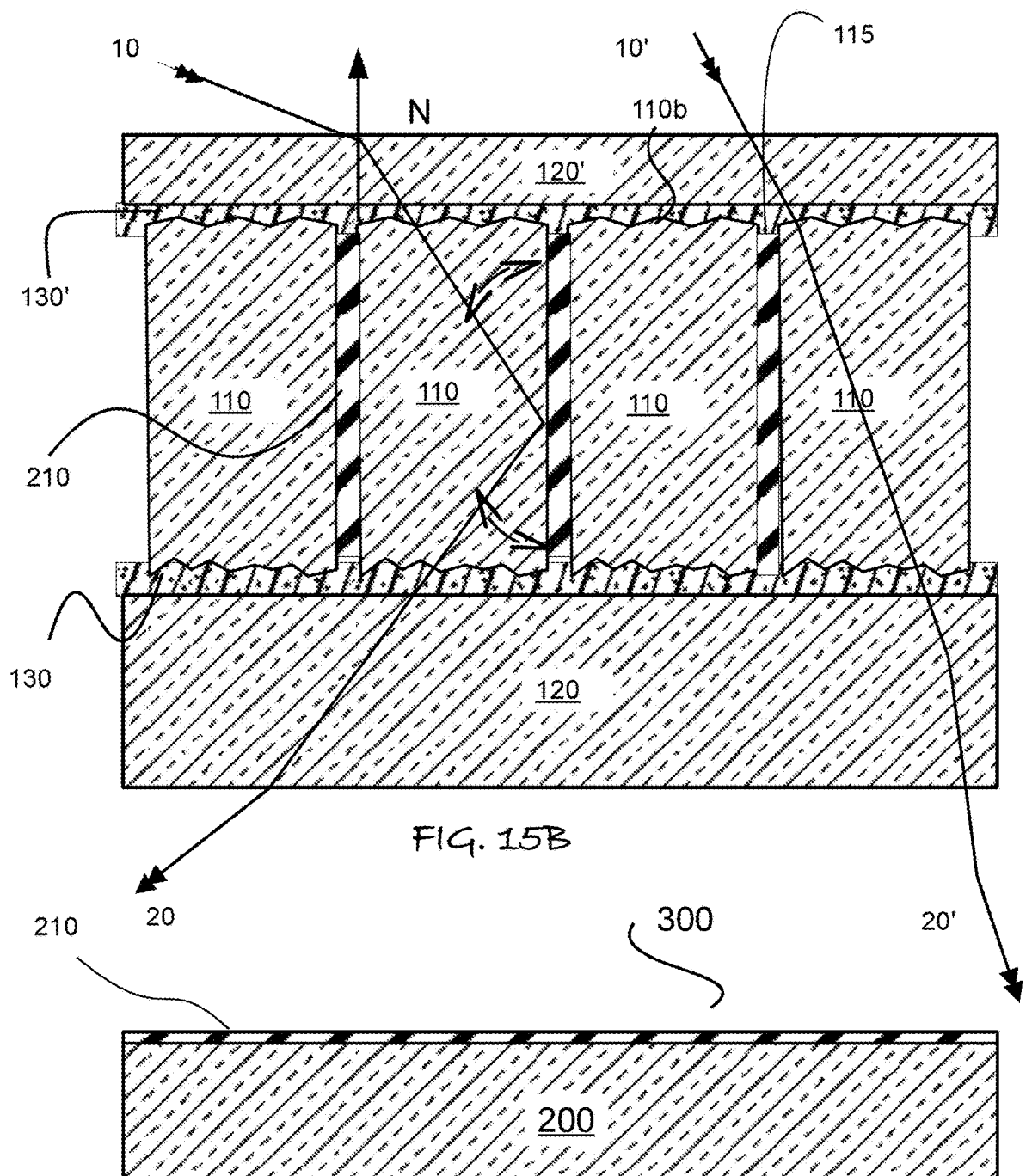
FIG. 15A is a cross sectional elevation of an alternative sheet material for fabricating optical elements in the structure of FIG. 15B in which a metalized reflective surface replaces a TIR surface.

FIG. 15A is a cross sectional elevation of an alternative sheet of optical quality material 300 for fabricating optical elements 110 in the structure of FIG. 15B in which a metalized reflective surface 210 replaces a TIR surface. The metal layer 210 avoids the need to create air gaps, and provides reflection over a higher angular range. The metal layer 210 is supported and directly attached directly to the planar sheet of optical quality material 200. The fabrication processes may utilize steps referenced with respect other embodiments generally relating to forming TIR surfaces at gap, but for eliminating the need to form gaps. However, in place of gaps, an adhesive can be used to connect each optical element 110 to the next adjacent optical element.

Figures 16A, 16B:
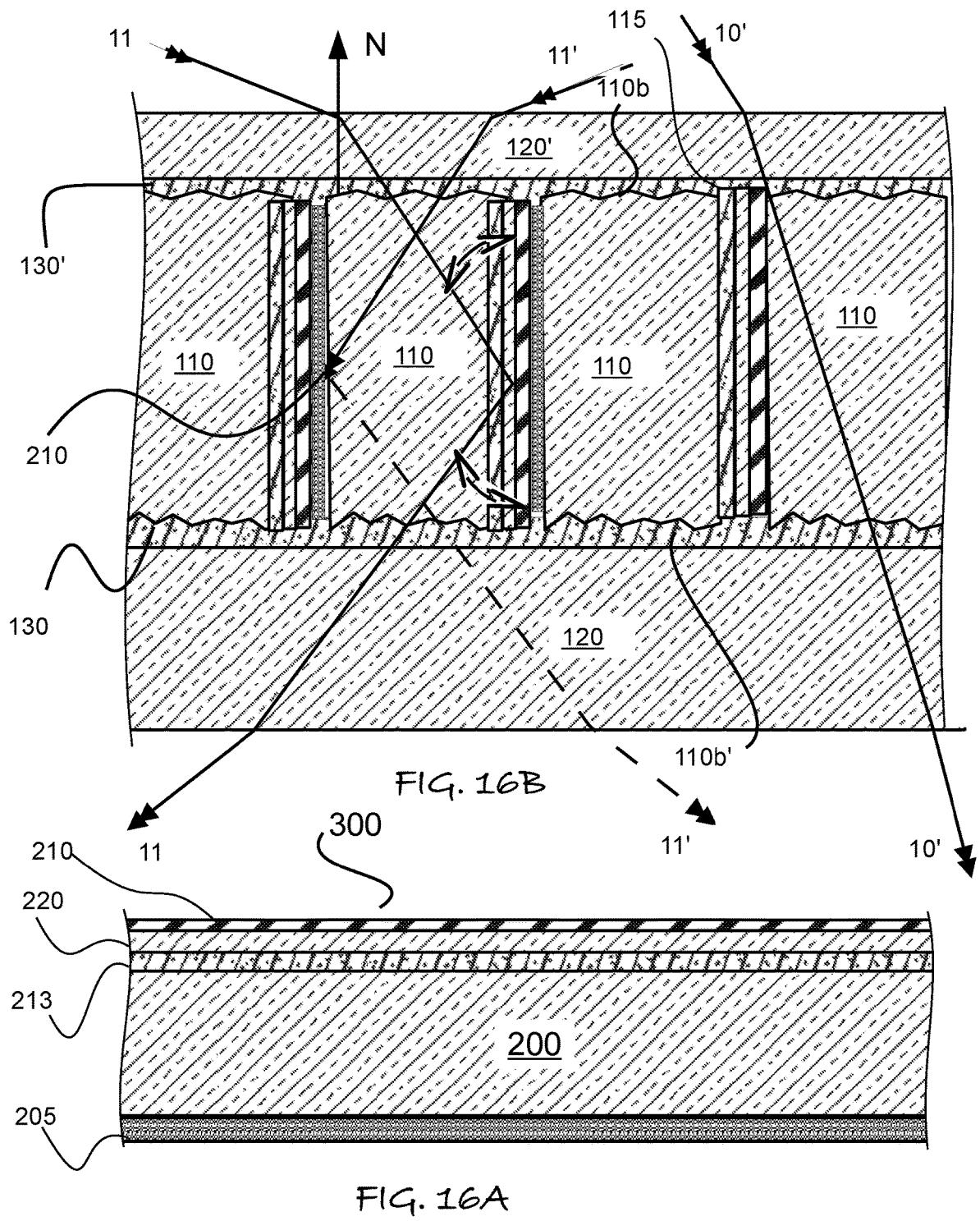
FIG. 16A is a cross sectional elevation of an alternative sheet material for fabricating optical elements in the structure of FIG. 16B in which a metalized reflective surface replaces a TIR surface.
Figure 17:
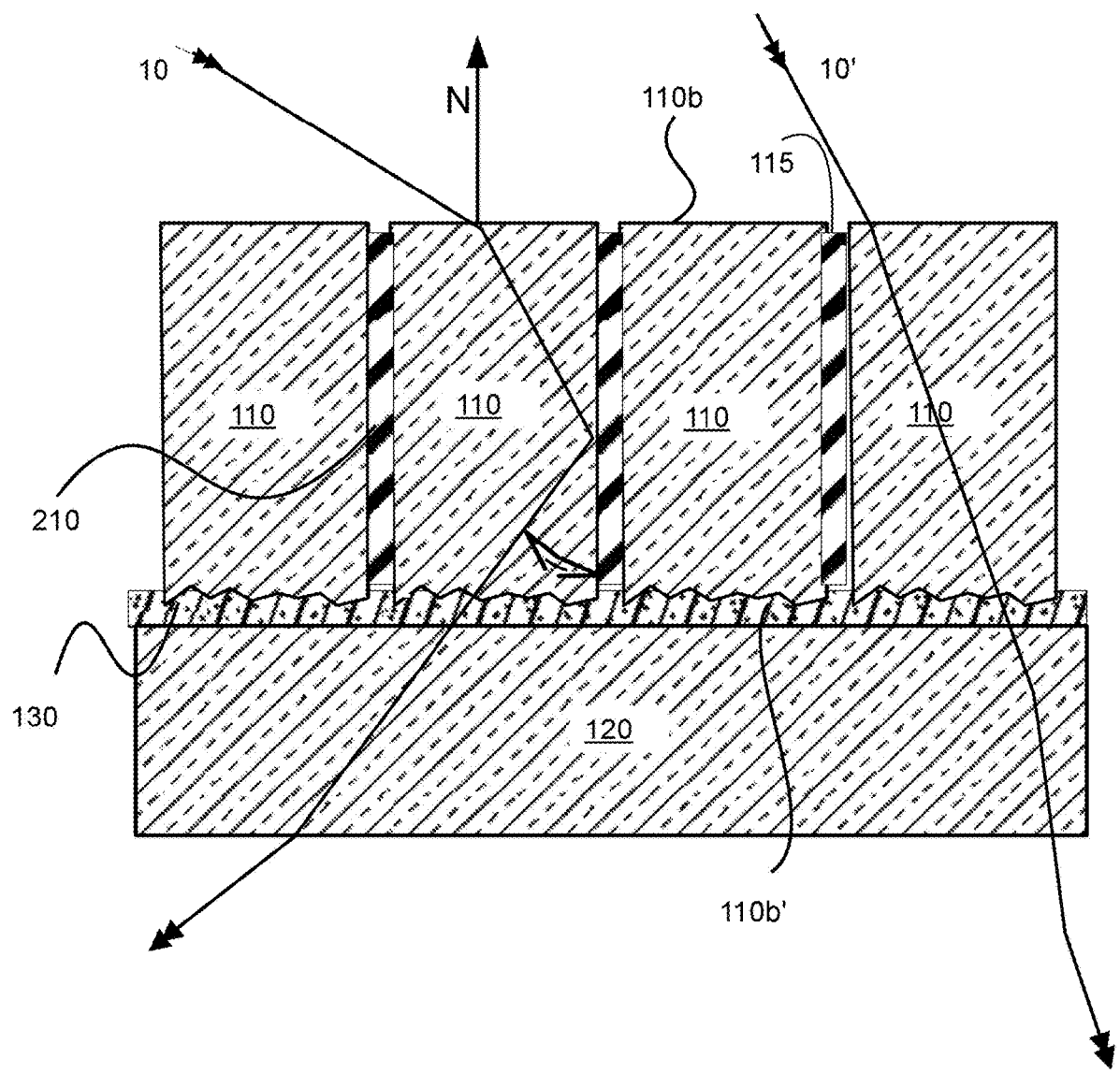
FIG. 17 is a cross sectional elevation of an alternative embodiment in which a metalized reflective surface replaces a TIR surface.

FIG. 16A is a cross sectional elevation of an alternative sheet material 300 for fabricating optical elements 110 in the structure of FIG. 16B in which a metalized reflective surface 210 replaces a TIR surface 110a and 110a'. While FIG. 15A shows the metal layer 210 attached directly to a planar substrate, in FIG. 16A, the metal layer 210 is supported and directly adheres to a flexible web or film that is transparent 220, which is attached to the sheet of optical quality material 200 with an optical quality adhesive layer 213, which is preferably a pressure sensitive adhesive. Otherwise, the remainder of substrate 200 is transparent and preferably has flat smooth outer surfaces, but preferably native surface from casting or molding.

Alternatively, a light absorbing layer can be applied to the back of either the sheet in FIG. 15A or 15B, such as shown as layer 205 in FIG. 16A, If the adhesive used in cemented or attaching each optical elements 110 to the adjacent optical element 110 is not transparent, then metallic layer 210 must be either attached directly to the sheet or attached with optical quality film and optical quality adhesive. The use of less than the highest optical quality transparent materials will reduce efficiency, and cause optical scatter which will result in glare. It should be noted that while ray 11 coming from the upper left undergoes TIR exits in the lower left direction, ray 11' coming from the upper left corner is absorbed by layer 205, as the dashed extension thereof shows the light ray that would have exited substrate 120 but for the absorption rather than the TIR thereof.

Alternatively, If the adhesive used in cementing or attaching each of the optical elements 110 to an adjacent optical element 110 is optically opaque and absorbing of incident light, it provides the function of absorbing layers 405 and 205 in the other embodiments.

FIG. 17A is a cross sectional elevation of an alternative embodiment in which a metalized reflective surface 210 replaces a TIR surface, and the structure does not deploy a cover or superstrate (which is illustrated in other embodiments with reference no. 120') as there are not air gaps that need to be protected from contamination.

Figure 18A:
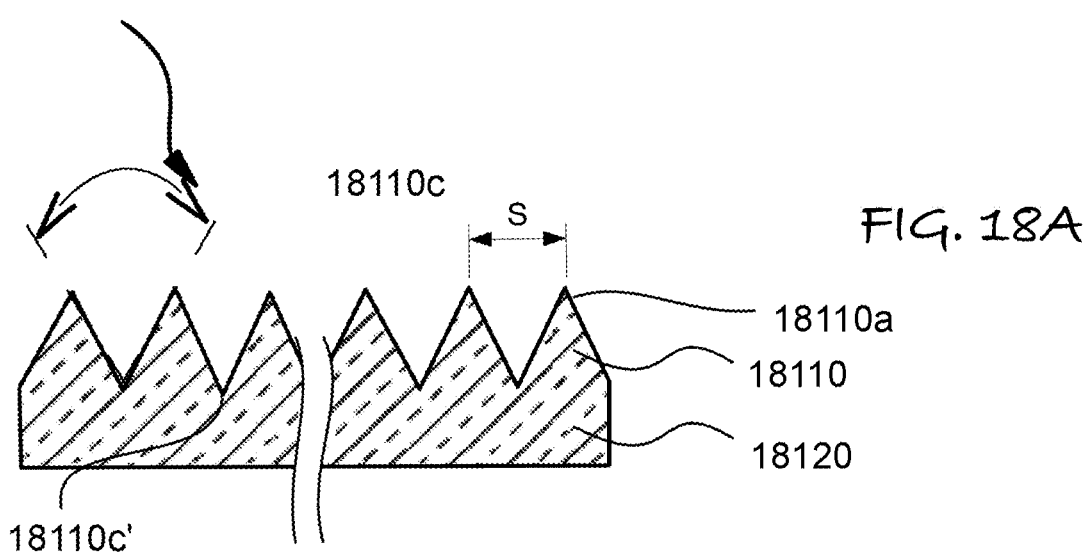
FIG. 18A is a cross-sectional elevation of another light re-directing structure having macro-dimensions in the form of a slat and other optional features to reduce glare, which are shown in a perspective view in FIG. 18B.
Figure 18B:
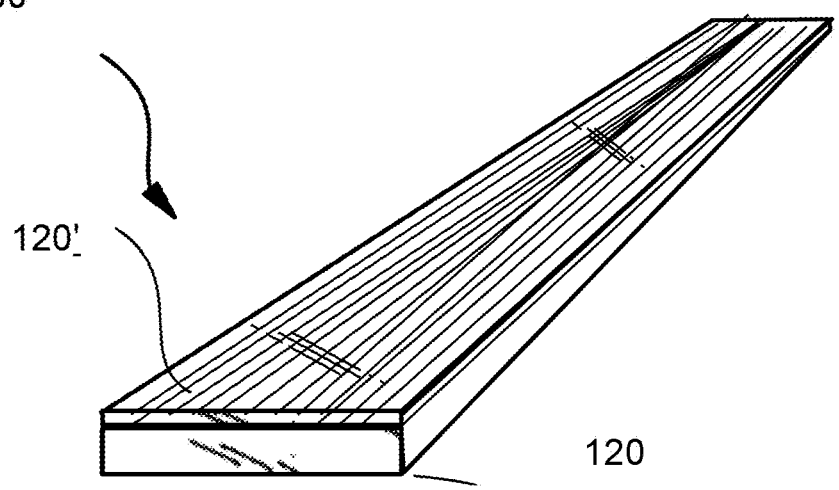
Figure 19:
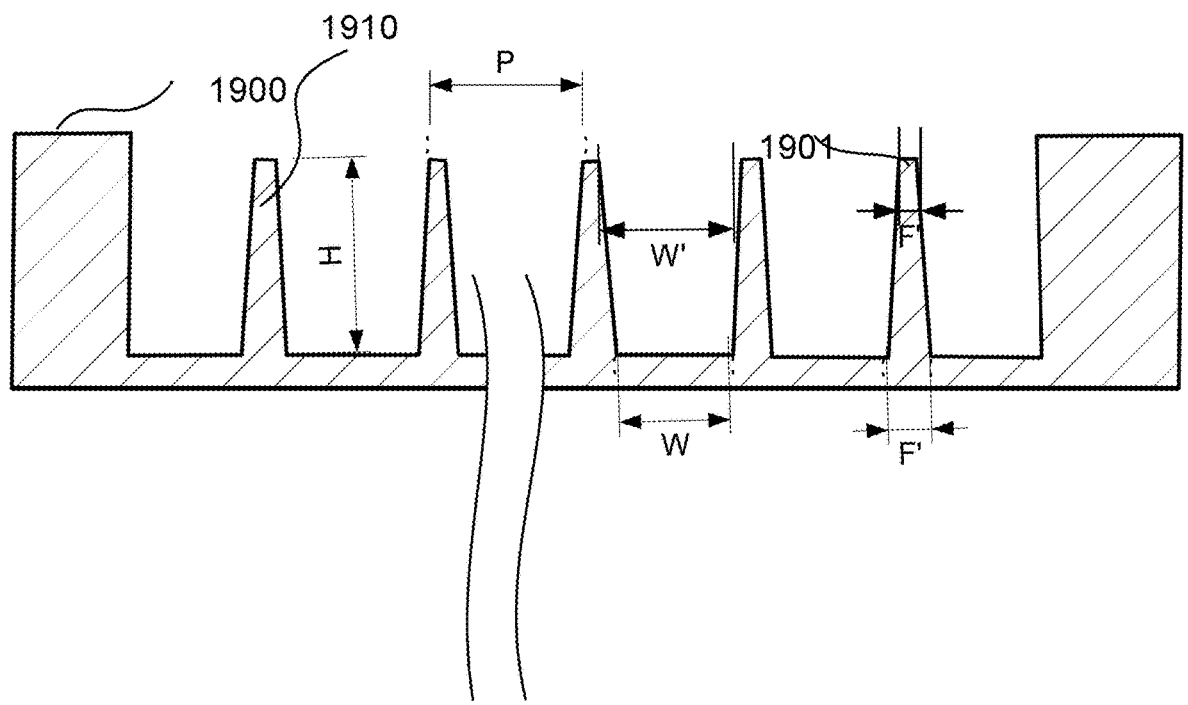
FIG. 19 is cross-sectional elevation of a mold for another light re-directing structure having macro-dimensions and other optional features to reduce glare.

FIG. 18-20 illustrate other light re-directing macrostructures used in tiltable slats 600 that would have decreased glare by the unique combination of large spacing or pitch of the TIR or metalized reflective surfaces (preferably greater than 1 mm) and sharp corners at the interfaces of any optical surface with another.

Specifically, FIG. 18A is a cross-sectional elevation of an alternative light re-directing structure that uses 45 degree sloped pyramids 18110 facing the light source, i.e. for glazing application, the sun that is external to the window. The pyramids are preferably integrally formed with the supporting optical base 18120 by molding, casting and the like, so as to have sharp, low radius inner corner 18110c' and sharp, low radius of curvature outer peaks 18100c.

FIG. 18B is perspective view of the same structure as a narrow and long slat for use in the embodiment of FIG. 9A-C.

Specifically, FIG. 18A is a slat 600 or the optically operable portion thereof having a 45 degree prism transparent TIR structure, with 50 mm wide louver/slat. The pitch, or spacing (S) is preferably at least about 0.5 mm, but more preferably greater than 1 mm, and the radius of the 45° corners 18110c' and 18100c are preferably equal to or less than about 10 µm, but more preferably less than about 5 µm, and yet more preferably less than about 2.5 µm to facilitate glare reduction. In fact, most preferably less than 0.5% of the groove spacing, S.

These small radii at corners 18110c' and 18100c can be readily produced in macro-spaced or pitch TIR surface by the diamond turning machine (DTM) via fly cutting of a molding surface than in making micro-scale masters. The slat 600 can then be molded in casting resin, injection molded or compression molded. It can also be molded in 12" lengths and arrayed on a substrate to make 24", 36", or 48" lengths. In contrast, micro-fabrication procedures and molds cannot provide such a small radius of curvature, particularly in proportion to the pitch of the TIR or reflective surface.

Figure 20A:
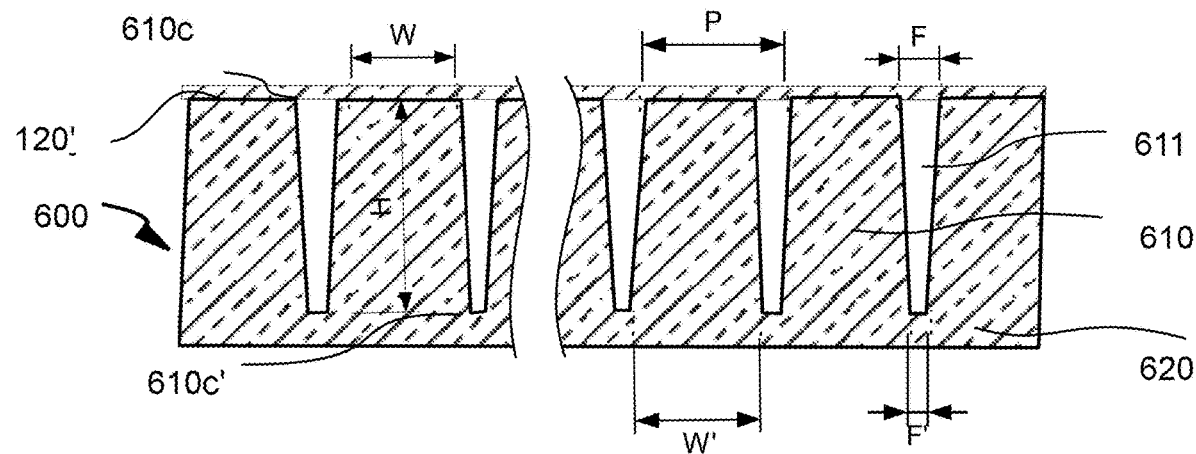
FIG. 20A is a cross-sectional elevation of the light re-directing structure having macro-dimensions corresponding to the mold structure in FIG. 19, which is shown in a perspective view in FIG. 20B.
Figure 20B:
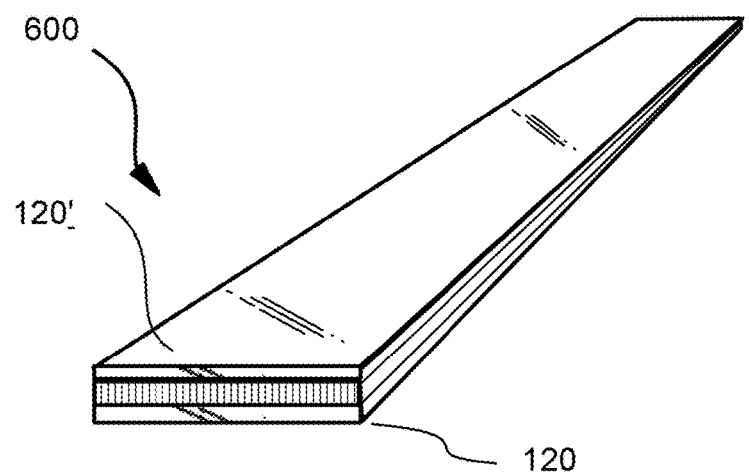

A more preferred embodiment is illustrated in FIGS. 19 and 20A and 20B, in which FIG. 19 is a cross-sectional elevation of a mold 1900 which is preferably produced by DTM for molding the light re-directing slat 600 shown in cross-section and perspective view in FIGS. 20A and 20B respectively. The mold 1900 has high aspect ratio fins 19100 with a lower or base width F', and height H, and a gap W' between adjacent fins 19100. The spacing W' between the fins 19100 defines the pitch, P, of the TIR surfaces in each optical element 610 (FIG. 20A) that stands upright from integrally molded base 620. Hence, the light re-directing slat 600 (FIG. 20B) produced from mold 1900 has optical elements 610 with gaps or groove 611 to provide slightly tilted TIR surface spaced apart laterally at a groove spacing or pitch, P, which is equal to W+F (the width of the top of each groove) or W'+F'. The Pitch, P, is at least equal to or greater than 500 µm, but more preferably greater than 1000 µm. The grooves 611 have a V-shape with a flat bottom. The corner radii at the groove top and bottom should be less than 5 µm to further facilitate glare reduction. In fact, it is preferably less than 0.5% of the groove spacing or pitch. Superstrate 120' seals the gaps or grooves 611.

In order to manufacture the slat 600, a mold 1900 of the inverted shape form is required, as shown in FIG. 19. Note the aspect ratio (H/W) of the sharp fins 19100 is preferably about 6.8:1, but the ratio of the molded optical elements 610 in FIG. 20A is 1.6:1. In the case of low diffraction, macro optical elements, the depth of these fins are optionally 658 µm, 1316 µm, and 2632 µm, respectively, for groove spacing's of 500, 1000 µm & 2000 µm.

In general, the larger groove depths of the mold 19000 do not make it feasible to master these structures on cylinders, as is the case for the micro single letter "V" shape or form, such as are used in forming a micro-structured light re-directing structure on a flexible web. In this case, the form/mold 1900 will need to be fly cut in the flat and replicated in the flat. This mastering is feasible on large diamond turning machines. Further, the replication process or method for this embodiment, as well as that of FIGS. 18A and 18B, can be casting, injection molding, compression molding, or UV-curing in the flat. While these batch manufacturing methods are generally not practical for continuous film constructions, they are highly effective for the direct production of the slat 600 shown in FIGS. 20A and 20B. The slat 600 is optionally cast or molded at a thickness or with ribs, bosses and other structure to impart rigidity, or laminated to a transparent substrate to form the slats or a more rigid sheet. Alternatively, molded optical structure when laminated to an optical support structure can be a tiled, or parquet assembly. In addition, 2"×12" and 12"×12" optical tiles could be assembled in windows using a parquet method.

It should be appreciated that another aspect of the invention are slat 600 with aspects ratio of 6 or more, but more preferably at least 12, and more preferably at least about 24 and greater, which have width of 40-60 mm's.

The light directing structures in such slats may deploy reflective surfaces at pitches of 500 microns or greater to minimize glare, with the specific construction of the light reflecting surfaces being the triangle V structure of FIG. 18A, the deep symmetric V-structure of FIGS. 11B and 18B, as well as asymmetric deep V-structure in which alternating reflective surface are parallel to the surface normal direction and then tilted with respect to the surface normal as in the symmetric V-structures. The deep V-structure, which have planar upper surfaces between the deep grooves provide see through visibility with the glare reduction from the larger spacing of TIR reflective surface.

It should now be appreciated that the inventive method of fabrication and resulting optical structure provides a plurality of improvements in the performance of prior art light re-directing structures. The inventive structures, when formed with very high aspect ratios, sharp corners and minimal gaps for TIR have a high efficiency as this combination of structural features are not possible to make by current micro-fabrication methods. The macro-structures also reduce glare and eliminate rainbow like colors bands being projected on the ceiling, which is caused by diffraction. However, these benefits are obtained while still maintaining see through clarity when desired. In select embodiments light re-direction at high angles of incidence only occurs when light is incident at high angle in downward direction, whereas nuisance light source from below are absorbed. Further, the fabrication methods facilitate the production of rotatable louvers or slats that provide the same optical benefits.

It should be appreciated that while macro-reflective surfaces have been suggested in the prior art for light re-direction, there was no appreciation that such structure would still product glare unless the corners where extremely sharp. The prior art fails to disclose methods of fabrication that can inherently produce such square, that is small radius of curvature corners as discussed herein with respect to preferred embodiments In summary a most preferred embodiment of the macro-optical element light directing structure has a greater than 3:1 aspect ratio, a TIR surface pitch of 0.5 mm or greater, and corners with a radius of curvature of less than about 5 μm. The gaps created to produce the reflective surfaces, particularly TIR surfaces, are preferably are less than 1 to 2 percent of the face cross-section or pitch of the TIR surface.

Another variant of the invention is illustrated in FIG. 21A as cross-sectional elevation of see through light directing structure 2100 in which the TIR or reflective surfaces are replaced with absorbing surfaces 205 by fabricating the structure from the planar sheet material 400 shown in cross-sectional elevation in FIG. 21B or FIG. 21C, which are an optical quality planar sheet 200 having light absorbing layers 205 on 2 side in FIG. 20B, or both side in FIG. 20C. Any of the fabrication methods used to produce other embodiments from sheet 200 or 300 can be used to produce optical structure 2100. Optical structure 2100 has the property that incident light off axis from the surface normal, N, will be absorbed. The angular range for see transparency is set by the aspect ratio of the optical elements. Hence light ray 14 incident from the top of the page is absorbed on hitting layer 205, while light ray 14' is transmitted.

It should be understood that the description of an aspect, feature or element of the invention in one embodiment, does not preclude the use and combination of other features, aspects or elements in a different embodiment. While the invention has been described in connection with sever embodiment, including preferred embodiments, it is not intended to limit the scope of the invention to the particular form set forth, but on the contrary, it is intended to cover such alternatives, modifications, and equivalents as may be within the spirit and scope of the invention as defined by the appended claims.

I claim:

1. A slat for assembly into a louver assembly for variable light re-direction, the slat having an aspect ratio of a length to a width of at least about 6 and a plurality of spaced apart reflective surfaces with a pitch of at least about 500 microns and in which the reflective surfaces have edges with a radius of curvature of less than about 2% of a pitch in which the reflective surface are spaced apart.

2. The slat for assembly into a louver assembly for variable light re-direction according to claim 1 wherein the reflective surface of said plurality are total internal refection (TIR) surfaces.

3. The slat for assembly into a louver assembly for variable light re-direction according to claim 1 wherein the reflective surfaces of said plurality have an aspect ratio of a pitch of the reflective surface to a height of the reflective surface of at least about 1.5.

4. The slat for assembly into a louver assembly for variable light re-direction according to claim 1 in which the spaced apart reflective surfaces of said plurality are parallel to each other.

5. The slat for assembly into a louver assembly for variable light re-direction according to claim 4 wherein the reflective surfaces of said plurality have an aspect ratio of the pitch of the reflective surface to a height of the reflective surface of at least about 1.5.

6. The slat for assembly into a louver assembly for variable light re-direction according to claim 1 and in which the adjacent spaced apart reflective surfaces of said plurality have at least one of a triangular shape, a symmetric V-shape and an asymmetric V-shape.

7. The slat for assembly into a louver assembly for variable light re-direction according to claim 6 wherein the slat has see-through visibility and the reflective surface of said plurality are total internal refection (TIR) surfaces.

8. The slat for assembly into a louver assembly for variable light re-direction according to claim 7 wherein the reflective surface have an aspect ratio of pitch of the reflective surface to the height of the reflective surface of at least about 1.5.

9. The slat for assembly into a louver assembly for variable light re-direction according to claim 1 the slat having an aspect ratio of a length to a width of at least about 12.

10. The slat for assembly into a louver assembly for variable light re-direction according to claim 1 the slat having an aspect ratio of at least about 24.

11. A slat for assembly into a louver assembly for variable light re-direction, the slat having an aspect ratio of a length to a width of at least about 6 and a plurality of spaced apart reflective surfaces with a pitch of at least about 500 microns, in which the slat further comprises;
   a) a plurality of transparent solid polymeric bars having opposing native optical quality surfaces oriented in a vertical plane, each bar separated from the native surface of the adjacent bar by a gap,
   b) a first transparent planar support member connecting common surfaces on a first side of the bars that is orthogonal to the native optical quality surface,
   c) an adhesive material interposed between and connecting the common surfaces of the polymeric bars and the planar support member, in which the adhesive material fills optical imperfections of the first side of the bars that is connected to the transparent planar support member, and
   d) in which the native optical surfaces at the gaps provide the plurality of spaced apart reflective surfaces.

12. The slat for assembly into a louver assembly for variable light re-direction according to claim 11 and in which edges of the native optical quality surface have a radius of curvature of less than about 2% of gap.

13. The slat for assembly into a louver assembly for variable light re-direction according to claim 11 wherein the reflective surface have an aspect ratio of the gap to a height of the reflective surface of at least about 1.5.

* * * * *